United States Patent [19]

Gosselink et al.

[11] Patent Number: 5,691,298

[45] Date of Patent: Nov. 25, 1997

[54] ESTER OLIGOMERS SUITABLE AS SOIL RELEASE AGENTS IN DETERGENT COMPOSITIONS

[75] Inventors: Eugene Paul Gosselink, Cincinnati; James Albert Cleary; Robert Henry Rohrbaugh, both of Indian Springs; Margaret Robinson Tallmadge, Cincinnati; Shulin Zhang, West Chester, all of Ohio

[73] Assignee: The Procter & Gamble Company, Cincinnati, Ohio

[21] Appl. No.: 545,351

[22] Filed: Nov. 22, 1995

Related U.S. Application Data

[63] Continuation-in-part of Ser. No. 355,938, Dec. 14, 1994, abandoned.

[51] Int. Cl.$^6$ ............................................. C11D 1/28
[52] U.S. Cl. ........................ 510/475; 560/14; 528/295
[58] Field of Search ............................ 510/475; 560/14; 528/295

[56] References Cited

U.S. PATENT DOCUMENTS

| | | | |
|---|---|---|---|
| 4,150,216 | 4/1979 | Quack et al. | 528/290 |
| 4,554,328 | 11/1985 | Sinker et al. | 525/437 |
| 4,702,857 | 10/1987 | Gosselink | 252/174.21 |
| 4,713,194 | 12/1987 | Gosselink | 252/174.23 |
| 4,721,580 | 1/1988 | Gosselink | 252/90 |
| 4,764,289 | 8/1988 | Trinh | 252/8.6 |
| 4,818,569 | 4/1989 | Trinh et al. | 427/242 |
| 4,861,512 | 8/1989 | Gosselink | 252/174.23 |
| 4,877,896 | 10/1989 | Maldonado et al. | 560/14 |
| 4,968,451 | 11/1990 | Scheibel et al. | 252/549 |
| 4,976,879 | 12/1990 | Maldonado et al. | 252/8.7 |
| 5,102,564 | 4/1992 | Gardlik et al. | 252/8.9 |
| 5,234,610 | 8/1993 | Gardlik et al. | 252/8.6 |
| 5,332,527 | 7/1994 | Heinzman et al. | 252/546 |
| 5,360,568 | 11/1994 | Madison et al. | 252/102 |
| 5,360,569 | 11/1994 | Madison et al. | 252/102 |
| 5,415,807 | 5/1995 | Gosselink et al. | 252/174.21 |

FOREIGN PATENT DOCUMENTS

| | | | |
|---|---|---|---|
| 2240983 | 8/1991 | United Kingdom | C08G 63/688 |
| 92/04433 | 3/1992 | WIPO | C11D 3/00 |
| 92/17523 | 10/1992 | WIPO | C08G 63/672 |
| 94/22937 | 10/1994 | WIPO | C08G 63/68 |

OTHER PUBLICATIONS

Odian, George, "Principles of Polymerization", Process Conditions, Second Edition, Wiley, NY (1983) Chapter 2.8, pp. 102–105 month unavailable.

Derwent Abstracts #68–16189Q, JP 68026000, Kurashiki Rayon Co.

*Primary Examiner*—Jacqueline V. Howard
*Attorney, Agent, or Firm*—Richard S. Echler, Sr.; Brian M. Bolam; Kim William Zerby

[57] ABSTRACT

Soil release agents which comprise: an ester backbone comprising (1) units selected from dihydroxy or polyhydroxy sulfonate (e.g., a sulfoethyl ether of glycerin), a unit which is at least trifunctional whereby ester linkages are formed resulting in a branched oligomer backbone (e.g., glycerol), or mixtures thereof, (2) terephthaloyl unit, and (3) oxyalkyleneoxy unit; and one or more capping units (preferably anionic).

30 Claims, No Drawings

ESTER OLIGOMERS SUITABLE AS SOIL RELEASE AGENTS IN DETERGENT COMPOSITIONS

CROSS REFERENCE TO RELATED APPLICATION

This is a continuation-in-part application of U.S. application Ser. No. 08/355,938, filed Dec. 14, 1994, by Gosselink et al, now abandoned.

TECHNICAL FIELD

The present invention relates to ester compositions useful as soil-releasing ingredients in fabric care compositions and processes, especially laundry detergents.

1. Background of the Invention

A wide variety of soil release agents (s.r.a.'s) for use in in-home fabric treatment processes such as laundering, fabric drying in hot air clothes dryers, and the like are known in the art. Various s.r.a.'s have been commercialized and are currently used in detergent compositions and fabric softener/antistatic articles and compositions. Such s.r.a.'s typically comprise an oligomer ester "backbone" and one or more "end-cupping" units.

Nonionic and anionic s.r.a.'s are known in the literature, and some of each of these type of s.r.a.'s are commercially important. Anionic s.r.a.'s typically comprise an oligoester backbone, which may itself optionally contain various anionic substituents, and will usually terminate with one or more end-cupping units which are also anionic. For example, various oxy-alkylene/terephthalate/sulfoisophthaloyl oligomers end-capped with sulfoaroyl substituents comprise a known and important class of s.r.a.'s for use in laundry detergents and fabric conditioners.

Arguably, as between laundry detergents and fabric conditioners, the more difficult of consumer laundry products for the purpose of incorporating soil release agents are laundry detergents compositions. Compatibility requirements of soil release agents, especially with the alkaline, anionic detergent environments commonly present in such detergent compositions, provide a substantial technical challenge.

Additionally, in contrast to the fabric conditioning environment in which certain s.r.a.'s have been used, a soil release agent in consumer laundry products will usually be exposed to various detersive ingredients, such as anionic surfactants, alkaline builders, and the like. Such chemicals may reduce the effectiveness of soil release agents, for example, by preventing their deposition on fabrics. The soil release agents may, reciprocally, reduce the laundry benefits of detersive ingredients. In a "thru-the-wash" mode, it is especially important that no formulation ingredient, including the soil release agent, should promote redeposition of suspended soils in the laundry liquor; this would dull the appearance of the laundered fabrics.

Further, physical stability of s.r.a.'s is a consideration to formulators of detergent compositions. The presence of water, such as in liquid detergent formulations and concentrated aqueous solutions, is not acceptable for many known s.r.a.'s. The greater physical stability of the present invention s.r.a.'s allows much greater freedom to formulate the oligomers in heavy duty liquid detergents and laundry bars containing significant amounts of water without losing their performance through separation as a poorly water soluble (probably crystalline) phase. Their physical stability also allows in many cases for these s.r.a.'s to be handled as a concentrated aqueous stock solution. This combination of high performance and good physical stability makes these s.r.a.'s especially attractive for use in a wide range of product forms, such as granules, liquids and bar forms.

It has been discovered that these properties are obtained by modifying the backbone of the oligomer to include dihydroxy or polyhydroxy sulfonates and/or units capable of forming branched oligomer backbones. The use of these backbone structures further stabilizes the ester and is believed (while not to be limited by theory) to inhibit the desired amorphous form of the oligomer from converting to a less soluble crystalline form during processing, storage or use.

It is thus an object of the present invention to provide novel s.r.a.'s which are more effective and/or more stable in consumer products such as granular and liquid detergent compositions, novel detergent compositions containing stable s.r.a.'s, and their manufacturing process.

These and other objects are secured herein as will be seen from the following disclosure.

2. Background Art

U.S. Pat. No. 4,721,580, Gosselink, issued Jan. 26, 1988, discloses soil release oligomeric esters and mixtures thereof. See also U.S. Pat. No. 4,968,451, to Scheibel et al., issued Nov. 6, 1990. U.S. Pat. No. 4,764,289, Trinh, issued Aug. 16, 1988, discloses dryer-added fabric articles utilizing anionic polymeric soil release agents. See also U.S. Pat. No. 4,818,569, to Trinh et al., issued Apr. 4, 1989.

U.S. Pat. No. 4,702,857, Gosselink, issued Oct. 27, 1987, discloses block copolymer esters and mixtures thereof useful as soil release agents in detergent compositions. See also U.S. Pat. No. 4,861,512, to Gosselink, issued Aug. 29, 1989.

U.S. Pat. No. 4,877,896, Maldonado et al, issued Oct. 31, 1989, discloses end-capped esters useful as soil release agents in detergent compositions and fabric-conditioner articles comprising terephthalate esters.

WO 94/03740, published Oct. 13, 1994, relates to sulfonated ester oligomers suitable as dispersing agents in detergent compositions.

U.S. Pat. No. 4,150,216, Quack et al., issued Apr. 17, 1979, relates to hair-treatment agents from branched, sulfo-group containing copolyesters.

Types of synthetic and analytical methods useful herein are well illustrated in Odian, *Principles of Polymerization*, Wiley, N.Y., 1981, which is incorporated herein by reference. Chapter 2.8 of the Odian reference, entitled "Process Conditions", pp 102–105, focuses on the synthesis of poly (ethylene terephthalate).

SUMMARY OF THE INVENTION

The present invention encompasses novel, oligomeric, preferably branched, esters which are effective as soil release agents. Said esters comprise:

(1) a backbone comprising
  (a) at least one unit selected from the group consisting of dihydroxy or polyhydroxy sulfonate, a unit which is at least trifunctional whereby ester linkages are formed resulting in a branched oligomer backbone, and combinations thereof;
  (b) at least one unit which is a terephthaloyl moiety; and
  (c) at least one unsulfonated unit which is a 1,2-oxyalkleneoxy moiety;

and (2) one or more (nonionic and/or anionic) capping units.

The esters herein are of relatively low molecular weight (i.e., generally below the range of fiber-forming polyesters) typically having a number average molecular weight of less than about 8000 (preferably from about 500 to about 5000) daltons.

The detergent compositions provided herein comprise:

(i) at least about 1% of a detersive surfactant;

(ii) at least about 1% of a detergent builder; and (iii) at least about 0.01% of an oligomeric (preferably branched) ester soil release agent comprising:

(1) a backbone comprising:

(a) at least one unit selected from the group consisting of dihydroxy or polyhydroxy sulfonate, a unit which is at least trifunctional whereby ester linkages are formed resulting in a branched oligomer backbone, and combinations thereof;

(b) at least one unit which is a terephthaloyl moiety; and (c) at least one unsulfonated unit which is a 1,2-oxyalkleneoxy moiety;

and (2) one or more capping units.

Other optional detergent ingredients are also emcompassed by the fully-formulated detergent compositions provided by this invention.

Methods of laundering fabrics and providing soil release finish thereto are also included in this invention. The preferred method of laundering involves contacting the fabrics with a liquid medium (preferably a wash liquor; but also including soaking, for example as a pretreatment of the fabric prior to washing or treatment during or after the manufacturing process to protect the fabric), preferably comprising at least about 300 ppm of a detergent composition which comprises conventional detergent ingredients and said soil release agent for about 5 minutes to about 1 hour. The fabrics can then be rinsed with water and line or tumble dried. Preferably, the liquid medium comprises from about 900 ppm to about 20,000 ppm of conventional detergent ingredients and from about 0.25 ppm to about 200 ppm, most preferably from about 1 to about 50 ppm, of the soil release agent.

All percentages, ratios, and proportions herein are on a weight basis unless otherwise indicated. All documents cited are incorporated herein by reference.

DETAILED DESCRIPTION OF THE INVENTION

The present invention encompasses novel soil release agents and novel detergent compositions suitable for use in consumer fabric care products such as liquid or granular detergents or laundry bars. The esters herein can be simply characterized as oligomers which comprise an ester "backbone" (linear or preferably branched) and end-capping unit(s). Proper selection of the structural units which comprise the ester backbone and use of sufficient amounts of the end-capping units result in the desired soil release and physical properties of these materials. The essential and optional components of the compositions and esters are described in detail hereinafter.

Oligomeric Esters

It is to be understood that the soil release agents herein are not resinous, high molecular weight, macromolecular or fiber-forming polyesters but, instead, are relatively low molecular weight and contain species more appropriately described as oligomers rather than as polymers. Individual ester molecules herein, including the end-capping unit, preferably have molecular weights ranging from about 500 to about 5000 daltons, more preferably from about 500 to about 3500 rations, and most preferably from about 1000 to about 3000 daltons. By comparison, glycol-terephthalate fibrous polyesters typically average 15,000 or more in molecular weight. Accordingly, the soil release agents of this invention are referred to as "oligomeric esters" rather than "polyester" in the colloquial sense of that term as commonly used to denote high polymers such as fibrous polyesters. Note that in oligomers, much more than polymers, the nature of the end group(s) can importantly affect the properties. For this reason, a critical part of this invention involves control of the nature of end groups of the oligomers by utilizing selected capping units.

The esters of the invention may be "substantially linear" in the sense that they are not significantly branched or crosslinked by virtue of the incorporation into their structure of units having more than two ester-bond forming sites. The preferred esters herein, however, are "branched" by the inclusion of at least one unit which is at least trifunctional whereby ester linkages are formed resulting in a branched oligomer backbone, but these units are not used at levels which result in significant cross-linking, as will be described in more detail hereinafter. Examples of polyester branching are found in Sinker et al, U.S. Pat. No. 4,554,328, issued Nov. 19, 1985, and U.S. Pat. No. 4,150,216, Quack et al., issued Apr. 17, 1979. Furthermore, no cyclic esters are essential for the purposes of the invention but may be present in the compositions of the invention at low levels as a result of side-reactions during ester synthesis. Preferably, cyclic esters will not exceed about 2% by weight of the soil release agents; most preferably, they will be entirely absent from the agents.

Contrasting with the above, the term "substantially linear" as applied to the esters herein does, however, expressly encompass materials which contain side-chains which are unreactive in ester-forming or transesterification reactions, and oligomers containing such units are not viewed as "branched" by their inclusion in the oligomer. Thus, oxy-1, 2-propyleneoxy units are of an unsymmetrically substituted type; their methyl groups do not constitute what is conventionally regarded as "branching" in polymer technology (see Odian, Principles of Polymerization, Wiley, N.Y., 1981, pages 18–19, with which the present definitions are fully consistent) and are unreactive in ester-forming reactions.

The esters herein are generally viewed as having a structure comprising a "backbone" and one or more "capping units". "Capping units", as used herein, means those nonionic or anionic units capable of forming only one ester linkage (e.g., contains only one hydroxyl group or one carboxylate group) such that the unit is not incorporated into the backbone of the oligomer, but is incorporated only as a terminal unit. Preferred oligomers comprise anionic capping units, with or without nonionic capping units also being present in the oligomers. The ester "backbone" of the present soil release agent, by definition, comprises all the units other than the capping units. All the units incorporated into the esters are interconnected by means of ester bonds.

In the context of the structures of ester molecules disclosed herein, it should be recognized that the present invention encompasses not only the arrangement of units at the molecular level but also the gross mixtures of esters which result from the reaction schemes and which have the desired range of composition and properties. Accordingly, when the number of monomers or ratios of units are given, the numbers refer to an average quantity of units present in oligomers of the soil release agent.

(1) Backbone Units

The esters useful in the present invention comprise: (a) at least one monomer unit selected from the group consisting of dihydroxy or polyhydroxy sulfonate, a unit which is at least trifunctional whereby ester linkages are formed resulting in a branched oligomer backbone, and combinations thereof; (b) at least one unit which is a terephthaloyl moiety; and (c) at least one unsulfonated unit which is a 1,2-oxyalkleneoxy moiety.

(a) Units derived from dihydroxy or polyhydroxy sulfonate monomers:

These monomers incorporated within the ester backbone confer anionic charge to the backbone. Preferred units are alcohol-derived units having the structure:

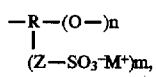

wherein n is an integer of 1 or greater (it is to be recognized that the "n" number of "O—" groups does not represent peroxide moieties, but rather are the number of hydroxyl-derived oxygen moieties capable of forming ester linkages within the backbone of the oligomer); m is an integer of 1 or greater; R is an alkyl-containing moiety having at least 2 carbon atoms; Z is a side-chain moiety selected from the group consisting of alkyl (e.g., Z=R' being an alkyl moiety having at least 1 carbon atom), oxyalkyl (e.g., Z=OR' moiety having an ether linkage from the R moiety to the R' moiety), alkyloxyalkyl (e.g., Z=R'OR' moiety having one or more ether linkages connecting R' moieties), aryl (e.g., Z=phenyl; benzyl), oxyaryl (e.g., Z=phenol-derived moieties having an ether linkage connecting the R moiety to an aryl moiety), alkyloxyaryl (e.g., Z=side-chain moieties comprising one or more ether linkages connecting alkyl- and aryl-containing moieties), or Z may be a single bond when R contains 3 or more carbon atoms (i.e., such that the sulfonate moiety is attached directly to R), and combinations thereof, and M is a cationic moiety, preferably selected from hydrogen, alkali metal salts, ammonium salts, etc. The monomers from which these units are derived do not have more than one hydroxyl group on any one carbon atom, and do not have a hydroxyl group and a sulfonate group on any one carbon atom.

Examples of monomers capable of forming such units include:

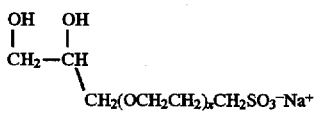

described herein as "SCE$_x$G" units, wherein x is from about 0 to about 20;

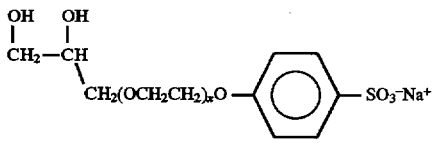

described herein as "SPE$_x$G" units, wherein x is from about 0 to about 20; and

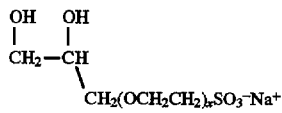

described herein as "SE$_x$G" units, wherein x is from about 0 to about 20, which includes for example (when x=0) 2,3-dihydroxypropanesulfonate having the structure:

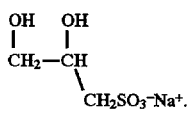

It is to be noted for the present invention that these herein described "SCE$_x$G", "SE$_x$G", and "SPE$_x$G" units also include the isomeric structures to those illustrated hereinbefore wherein the side-chain moieties are connected to the 2 position of a 1,3-diol unit.

Most preferred monomers are the dihydroxysulfonate monomer which is a sulfoethyl ether of glycerin ("SEG") having the structures:

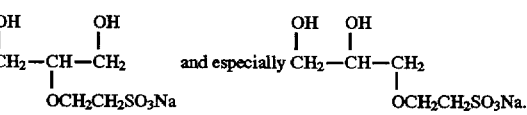

SEG may be readily prepared, for example, by reacting glycerin with sodium isethionate (HOCH$_2$CH$_2$SO$_3$Na) in the presence of heat and base. Surprisingly, this base catalyzed reaction requires an unusually high level of base catalyst to give conversion to high quality SEG in a reasonable amount of time. At least about 12 mole % hydroxide base (preferably NaOH) is required relative to the isethionate, typically at least about 15 mole %, and preferably about 20 mole %. Preferred oligomers of the present invention are then prepared by reacting SEG with a terephthaloyl-containing reactant, preferably at elevated temperatures, as described in the examples hereinafter.

It is to be noted that this reaction may produce some amount of SEG disulfonate which is the result of glycerin reacting with 2 moles of isethionate as follows:

HO—CH$_2$CH(OH)CH$_2$OH + 2[HOCH$_2$CH$_2$SO$_3$Na] ⟶

NaO$_3$S(CH$_2$)$_2$OCH$_2$CH(OH)CH$_2$O(CH$_2$)$_2$SO$_3$Na +

NaO$_3$S(CH$_2$)$_2$OCH$_2$CH(OCH$_2$CH$_2$SO$_3$Na)CH$_2$OH.

These SEG disulfonate groups can be incorporated into the polymer in a manner similar to any of the capping groups described hereinafter.

It is also to be recognized that during the polymerization reaction, some of the SEG monomers may react with other monomers to yield low molecular weight materials which can then be further incorporated into the polymer. For example:

(i) SEG dimers may be formed by reaction of two SEG monomers, such as:

2[NaO$_3$S(CH$_2$)$_2$O—CH$_2$CH(OH)CH$_2$OH]→
[NaO$_3$S(CH$_2$)$_2$OCH$_2$CH(OH)CH$_2$]$_2$O+positional isomers "SEG dimer"

It is to be noted that the above SEG dimer is just one of several different positional isomers possible from 2 SEG monomers reacting.

(ii) SEG plus ethylene glycol and/or propylene glycol monomers, such as:

NaO₃S(CH₂)₂OCH₂CH(OH)CH₂OH + HOCH₂CH(OH)—R

NaO₃S(CH₂)₂OCH₂CH(OH)CH₂—O—CH₂CH(OH)—R

+ positional isomers where R=H and/or CH₃.

These preceeding SEG-containing reaction products [from (a) and (b) above] can be incorporated into the polymer backbone via the two free hydroxy moieties.

(iii) SEG plus any of the capping groups, such as

NaO₃S(CH₂)₂OCH₂CH(OH)CH₂OH + H[OCH₂CH₂]₃SO₃Na

NaO₃S(CH₂)₂OCH₂CH(OH)CH₂[O—CH₂CH₂]₃SO₃Na

+ positional isomers

This can then be incorporated into the polymer in a manner similar to any capping group via the free hydroxy moiety.

(b) Multi-functional, ester branching units:

These monomers, which are at least trifunctional, form ester linkages resulting in a branched oligomer backbone. Preferred units have the structure:

(—O)ₐ—R"—(CO₂—)ᵦ wherein a+b is at least 3 and a and b are zero or greater, preferred is a=2 or greater, and most preferred is a=3 or greater and b=0; and R" is an alkyl, aryl, or alkylaryl moiety having at least 3 carbon atoms, and wherein further for those R" comprising an aryl moiety, the number "a" of hydroxy groups capable of forming ester backbone linkages does not include phenol hydroxyl groups. The monomers from which these units are derived do not have more than one hydroxyl group on any one carbon atom. More preferred are branch-forming monomers which contain at least one 1,2-diol (e.g., HOCH₂CH(OH)—R") moiety. Most preferred is glycerin.

Another example of a multi-functional, ester branching unit herein is derived from trimellitic acid:

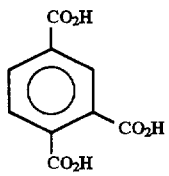

and the unit derived from the dihydroxy acid:

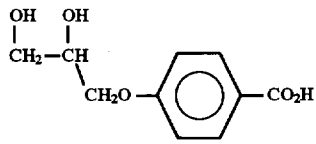

which as used herein includes units derived not only from monomers in the acid form illustrated but also from the corresponding ester monomers.

When a branch-inducing monomer is included, its level must be low enough to avoid introduction of significant crosslinking into the oligomer. In general, this requires that the following relationship is obeyed:

$$\Sigma n_i \geq \Sigma m_i[p_i-2];$$

preferably, $$\Sigma n_i \geq 1 + \Sigma m_i[p_i-2];$$

and more preferably, $$\Sigma n_i \geq 2 + \Sigma m_i[p_i-2];$$

wherein: $n_i$=number of each kind i of capping units incorporated; $m_i$=number of each kind i of branch-inducing monomer incorporated; $p_i$=number of functional groups per branch-inducing monomer i which are capable of forming connecting links with other monomers under the reaction conditions.

(c) Terephthaloyl units:

The esters useful herein further comprise terephthaloyl units having the formula —CO—C₆H₄—CO—. It should be noted that these aryldicarbonyl units need not exclusively be terephthaloyl units provided that the polyester-fabric-substantivity of the ester is not harmed to a significant extent. Thus, for example, amounts of isomeric dicarbonyl units, isophthaloyl or the like, are acceptable for incorporation into the esters. Further, while it is required that the oligomers comprise at least some uncharged terephthaloyl units, it is to be recognized that amounts of aryldicarbonyl units having charged substituents (e.g., sulfonate substituents, such as sulfoisophthalate moieties described herein as "SI" units) may be present in the in the ester backbone, as long as the fabric substantivity is not harmed to a significant extent. SI is a preferred charged diaroyl unit for use herein the present oligomers.

The average number of terephthaloyl units per polymer is at least about 2, preferably at least about 2.5. The average number of terephthaloyl units is typically in the range of from about 2 to about 20, preferably from about 3 to about 11, and more preferably from about 3 to about 9.

Furthermore, the preferred oligomers have a ratio of the average number of anionic charges per molecule to the average number of terephthaloyl units per molecule within the range of from about 0.25 to about 4, preferably from about 0.5 to about 3, and most preferably from about 0.6 to about 2.

(d) 1,2-oxyalkyleneoxy units:

The present invention esters further comprise a 1,2-oxyalkyleneoxy unit, such as derived from ethylene glycol and/or propylene glycol. Such units include for example oxy-1,2-propyleneoxy units [i.e., —OCH(CH₃)CH₂O— or —OCH₂CH(CH₃)O—], oxyethyleneoxy units (i.e., —OCH₂CH₂O—), and mixtures thereof. This does not include, however, oxyethyleneoxy units which are part of a poly(oxyalkylene)oxy chain comprising two or more consecutive oxyalkylene units.

It is to be appreciated that in esters in which oxy-1,2-propyleneoxy units are also present, the oxy-1,2-propyleneoxy units can have their methyl groups randomly alternating with one of the adjacent —CH₂— hydrogen atoms, thereby lowering the symmetry of the ester chain. Thus, the oxy-1,2-propyleneoxy unit can be depicted as having either the —OCH₂CH(CH₃)O— orientation or as having the opposite —OCH(CH₃)CH₂O— orientation. Carbon atoms in the oxy-1,2-propylene units to which the methyl groups are attached are, furthermore, asymmetric, i.e., chiral; they have four nonequivalent chemical entities attached.

The ratio of incorporated oxyethyleneoxy and oxypropyleneoxy units (E/P) may be from 0 to infinity (i.e., all E), but is preferably from about 0.5 to infinity and more preferably from about 0.7 to about 3. Further, for use in granular detergent formulations, a higher E/P ratio of about 1 to infinity is most preferred.

(e) Di(oxyethylene)oxy and Poly(oxyethylene)oxy Units:

Optionally, di(oxyethylene)oxy units are preferably present when the backbone unit comprises 8 or more terephthaloyl units; however, at least some di(oxyethylene)oxy units may be present in esters with as few as 1.5 terephthaloyl units.

The total average weight percent of optional poly (oxyethylene)oxy units in the soil release agent composition can be balanced to give acceptable melt viscosity (i.e., below about 40,000 cPs at 230° C. and below about 160,000 cPs at 200° C.) while maintaining the desirable physical properties of the agent below about 50° C. Typically when present, the total average weight percent is about 1 to about 25 percent for anionic soil release agent compositions having an average of about 2.5 to about 5 anionic units per ester.

The amount of poly(oxyethylene)oxy units permissible in the backbone is related to its degree of polymerization. For example, oxyethyleneoxyethyleneoxyethyleneoxy units (formed from triethylene glycol), which have a degree of polymerization of three, can constitute from 0 to 75 mole percent of the total oxyalkyleneoxy units in the backbone. In another example, poly(oxyethylene)oxy units derived from PEG-600, with a degree of oligomerization of about 13, can constitute from 0 to about 50 mole percent of the total oxyalkyleneoxy units present in the backbone. Longer poly (oxyethylene)oxy units, such as those derived from PEG-2000 with a degree of oligomerization of about 45, can constitute from 0 to about 20 mole percent of the total oxyalkyleneoxy units in the backbone.

In general, for best soil release properties across a variety of detergent formulations, it is best to minimize the amount of poly(oxyethylene)oxy units in the ester to the amount necessary to achieve the desired melt viscosity and formulatability properties. Also, in general, it is preferrable to incorporate poly(oxyethylene)oxy units in the capping groups rather than in the backbone. Additionally, the amount of poly(oxyethylene)oxy units must be selected to avoid over promotion of backbone segment crystallization during cooling or subsequent storage or use. This is particularly important when a high proportion of the oxyalkyleneoxy units are oxyethyleneoxy. Preferred poly(oxyethylene)oxy units have degree of oligomerization within the range of from about 2 to about 10, preferably within from about 2 to about 6. It should be noted that monomers providing low molecular weight poly(oxyethylene)oxy units may be partially removed from the reaction mixture during the vacuum condensation step.

(2) Capping Units

The present invention esters encompass the end-capped oligomers disclosed herein and mixtures of said end-capped oligomers which may unavoidably contain some non-capped species. However, levels of the latter will be zero or at a minimum in all of the highly preferred soil release agents. Thus, when referring simply to an "ester" or "oligomer" herein, it is furthermore intended to refer, by definition, collectively to the mixture of capped and uncapped ester molecules resulting from any single preparation.

An example of a nonionic capping units are monomethyl ethers of polyethylene glycol ("MPEG").

Preferred anionic capping units include a) ethoxylated isethionate derivatives having the structure:

wherein x is 1 or greater, preferably from about 1 to about 20, more preferably from about 2 to about 10 and most preferably from about 2 to about 5, and M is a cationic moiety as described herein before;

b) ethoxylated propanesulfonate derivatives having the structure:

wherein x is 0 or greater, preferably from about 1 to about 20, more preferably from about 1 to about 15 and most preferably from about 1 to about 10, and M is a cationic moiety as described herein before;

c) ethoxylated propanedisulfonate derivatives having the structure:

wherein x is 0 or greater, preferably from about 1 to about 20, more preferably from about 1 to about 15 and most preferably from about 1 to about 10, and M is a cationic moiety as described herein before;

d) ethoxylated phenolsulfonate derivatives having the structure:

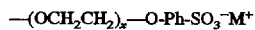

wherein x is 1 or greater, preferably from about 1 to about 20, more preferably from about 2 to about 10 and most preferably from about 2 to about 5, M is a cationic moiety as described herein before, and the sulfonate group is preferably para substituted;

e) sulfoaroyl derivatives, preferably the 3-sodiosulfobenzoyl monomer unit derived from 3-sodiosulfobenzoic acid or a suitable ester monomer; and f) SEG-disulfonate, as described hereinbefore.

The capping units used in the esters of the present invention may be mixtures of ethoxylated or propoxylated hydroxy-ethane and propanesulfonate (or propanedisulfonate) groups, sulfoaroyl groups, modified poly(oxyethylene)oxy units, and ethoxylated or propoxylated phenolsulfonate units.

It is not intended to exclude the acid form, but most generally the esters herein are used as sodium salts, as salts of other alkali metals, as salts with nitrogen-containing cations (especially tetraalkylammonium), or as the disassociated ions in an aqueous environment.

Examples of ethoxylated or propoxylated hydroxy-ethane and propanesulfonate end-capping groups include sodium isethionate, sodium 2-(2-hydroxyethoxy)ethanesulfonate, sodium 2-[2-(2-hydroxyethoxy)ethoxy]ethanesulfonate, sodium 2-{2-[2-(2-hydroxyethoxy)ethoxy]ethoxy}ethanesulfonate, sodium 2-{2-[2-(2-{2-hydroxyethoxy}ethoxy)ethoxy]ethoxy}ethanesulfonate, 3-[2-(2-hydroxyethoxy)ethoxy]propanesulfonate, and sodium alpha-3-sulfo-propyl-omega-hydroxy-poly(oxy-1,2-ethanediyl), with average degree of ethoxylation of 2–20, and mixtures thereof.

Preferred sulfoaroyl capping units are of the formula $(MO_3S)(C_6H_4)C(O)—$, particularly the ortho and meta isomers, wherein M is a salt-forming cation such as Na or tetraalkylammonium. Examples of preferred modified poly (oxyethylene)oxy monoalkyl ether units include poly (ethylene glycol, methyl ether), and poly(ethylene glycol, ethyl ether), with a degree of ethoxylation from about 5 to about 100. Examples of ethoxylated phenolsulfonate units include sodium 4-(2-hydroxyethoxy)benzenesulfonate, sodium 4-(2-hydroxypropoxy)benzene-sulfonate, sodium 4-(2-[2-hydroxyethoxy]ethoxy)benzenesulfonate, and sodium 4-(2-(2-(2-hydroxyethoxy)ethoxy)ethoxy) benzenesulfonate.

Monoethers of poly(oxyethylene)oxy units will have a wide range of volatility, inversely proportional to their molecular weight. Units with a degree of oligomerization of 5 or less will partially volatilize during the vacuum condensation step, whereas oligomers with a degree of oligomerization of over 5 will behave primarily as nonvolatiles. Consequently, when synthesizing oligomer esters with capping units comprising poly(oxyethylene)oxy units with a degree of oligomerization of 5 or less, an excess of polyethylene glycol, monoalkyl ether must be used to compensate for the losses arising from the volatility.

The soil release agents provided by the invention are well illustrated by one comprising from about 25% to about 100% by weight of ester having the empirical formula $(CAP)_x(EG/PG)_{y'}(DEG)_{y''}(PEG)_{y'''}(T)_z(SI)_{z'}(SEG)_q(B)_m$; wherein:

i): (CAP) represents said capping units (preferably anionic/nonionic mixture, and more preferably anionic);

ii): (EG/PG) represents said oxyethyleneoxy and oxy-1,2-propyleneoxy units;

iii): (DEG) represents said optional di(oxyethylene)oxy units;

iv): (PEG) represents said optional poly(oxyethylene)oxy units;

v): (T) represents said terephthaloyl units;

vi): (SI) represents said sulfoisophthaloyl units;

vii): (SEG) represents units derived from the sulfoethyl ether of glycerin and related units; and vii): (B) represents the branching units.

Furthermore, x is from about 1 to about 12, preferably from about 1 to about 4; y' is from about 0.5 to about 25, preferably from about 1 to about 15; y" is from 0 to about 12, preferably from 0 to about 8; y''' is from 0 to about 10, preferably from 0 to about 5; y'+y"+y''' totals from about 0.5 to about 25; z is from about 1.5 to about 25, preferably from about 2.5 to about 15; z' is from about 0 to about 12, preferably from about 0 to about 7; z+z' totals from about 1.5 to about 25; q is from about 0.05 to about 12, preferably from about 0.25 to about 7; m is from about 0.01 to about 10, preferably from about 0.1 to about 2; and wherein x, y', y", y''', z, z', q and m represent the average number of moles of the corresponding units per mole of said ester. Excellent soil release agents are those wherein at least about 50% by weight of said ester has a molecular weight ranging from about 500 to about 5,000.

In a preferred embodiment, the soil release agents provided by the invention are illustrated by one comprising from about 25% to about 100% by weight of ester having the empirical formula $(CAP)_x(EG/PG)_y(T)_z(SI)_{z'}(SEG)_q(B)_m$; wherein (CAP), (EG/PG), (T), (SI), (SEG), and (B) are as defined above; the oxyethyleneoxy:oxy-1,2-propyleneoxy mole ratio ranges from about 0.5:1 to infinity (i.e., no PG); x is about 2 to about 7, y' is from about 1 to about 15, z is from about 2 to about 20, z' is from about 0 to about 7, q is about 0.2 to about 8, and m is from about 0.05 to about 3. In a highly preferred embodiment of these soil release agents, x is about 2, y' is about 3 to about 5, z is about 5, z' is about 0, q is about 1, and m is about 0.2.

The following structures are illustrative of structures of ester molecules falling within the foregoing preferred embodiments, and demonstrate how the units are connected.

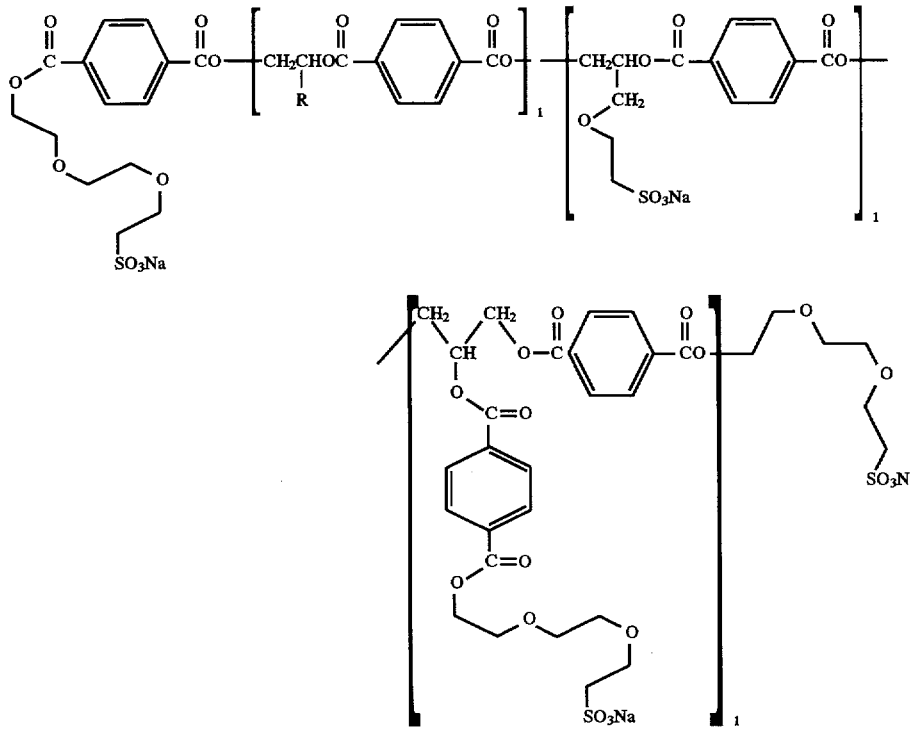

where R=H, CH$_3$ in 1.7:1 ratio, which is an example of an oligomer having three SE3 capping units, one SEG unit, and one glycerin unit incorporated into the oligomer structure. Note that typically some glycerin added as a monomer is lost as a volatile during vacuum condensation or otherwise lost due to transformation during the reaction process. Thus, to obtain an oligomer with an average of one incorporated glycerin-derived unit, more than one mole of glycerin must be used.

Another is an example of a "glycerin star" with SE2 caps, one glycerin incorporated, and no SEG unit, having the structure:

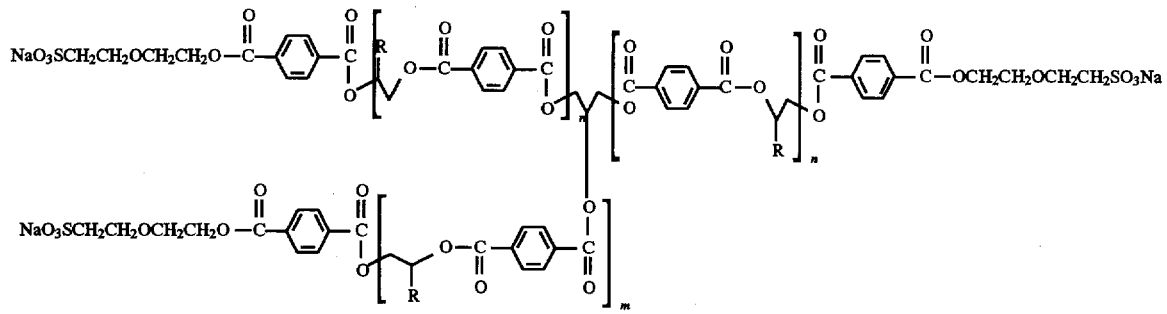

wherein n is from about 0 to about 5, and m is from about 0 to about 5.

A further example is a molecule "(SE2)2 4PE/PT, 1SEG" having 2 SE2 capping units, 4 terephthalates, 1 SEG, and no branching unit:

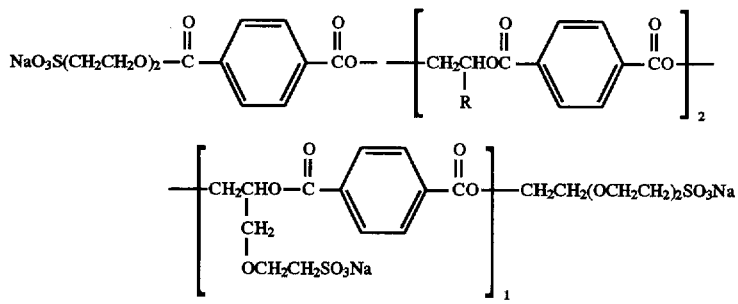

wherein R=H, CH3.

(C) Method for Making Esters—The ester soil release agents of the present invention can be prepared using any one or combination of several alternative general reaction types, each being well-known in the art. Many different starting materials and diverse, well-known experimental and analytical techniques are useful for the syntheses. Mechanistically, the suitable general reaction types for preparing esters of the invention include those classifiable as:

1. alcoholysis of acyl halides;
2. esterification of organic acids;
3. alcoholysis of esters (transesterification); and
4. reaction of alkylene carbonates with organic acids.

Of the above, reaction types 2–4 are highly preferred since they render unnecessary the use of expensive solvents and halogenated reactants. Reaction types 2 and 3 are especially preferred as being the most economical.

Suitable starting materials or reactants for making the esters of this invention are any reactants (especially esterifiable or transesterifiable reactants) that are capable of combining in accordance with the reaction types 1–4, or combinations thereof, to provide esters having the correct proportions of all the hereinbefore specified units of the esters. Such reactants can be categorized as "simple" reactants, i.e., those that are singly capable of providing only one kind of unit necessary for making the esters, or as derivatives of the simple reactants which singly contain two or more different types of unit necessary for making the esters. Illustrative of the simple kind of reactant is dimethyl terephthalate which can provide only terephthaloyl units. In contrast, bis(2-hydroxypropyl)terephthalate is a reactant that can be prepared from dimethyl terephthalate and 1,2-propylene glycol and which can desirably be used to provide two kinds of unit, viz. oxy-1,2propyleneoxy and terephthaloyl, for making the esters herein.

In principle it is also possible to use oligoesters, or polyesters such as poly(ethylene terephthalate), as reactants herein and to conduct transesterification with a view to incorporation of end-capping units while decreasing molecular weight. Nonetheless, the more highly preferred procedure is to make the esters from the simplest monomer reactants in a process involving molecular weight increase (to the limited extent provided for by the invention) and end-capping.

Since "simple" reactants are those which will most preferably and conveniently be used, it is useful to illustrate this kind of reactant in more detail. Thus, 2-[2-(2-hydroxyethoxy)ethoxy]-ethanesulfonate can be used as the source of one of the capping units herein. Note that the metal cation can be replaced by potassium or a nitrogen-containing cation provided that the latter does not overly promote crystallization of the oligomer and is unreactive during the synthesis, e.g. tetraalkylammonium. It is, of course, possible to subject any of the esters of the invention to cation exchange after the synthesis and, thereby, afford a means of introducing more esoteric or reactive cations into the ester compositions.

Appropriate glycols or cyclic carbonate derivatives thereof can be used to provide oxy-1,2-alkyleneoxy units;

thus, 1,2-propylene glycol or (where the starting carboxyl groups are present in an acidic form) the cyclic carbonate (III):

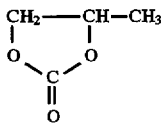

are suitable sources of oxy-1,2-propyleneoxy units for use herein.

Oxyethyleneoxy units are most conveniently provided by ethylene glycol. Although, as an alternative, ethylene carbonate could be used when free carboxylic acid groups are to be esterified. Oxydiethyleneoxy units are most conveniently provided by diethylene glycol. Poly(oxyethylene) oxy units are most conveniently provided by triethylene glycol, tetraethylene glycol, higher polyethylene glycols, and mixtures thereof. Additionally, minor amounts of poly (oxyethylene)oxy may be formed as a side reaction in the ester synthesis.

Aryldicarboxylic acids or their lower alkyl esters can be used to provide the essential aryldicarbonyl units; thus, terephthalic acid or dimethyl terephthalate are suitable sources of terephthaloyl units.

Other units of the esters will be provided by well-known and readily identifiable reagents; for example, dimethyl 5-sulfoisophthalate is an example of a reagent capable of providing 5-sulfoisophthaloyl units for optional incorporation into the esters of the invention. It is generally preferred that all such units should be provided by reactants in ester or dicarboxylic acid forms.

When starting with the simplest reactants as illustrated above, the overall synthesis is usually multi-step and involves at least two stages, such as an initial esterification or transesterification (also known as ester interchange) stage followed by an oligomerization stage in which molecular weights of the esters are increased, but only to a limited extent as provided for by the invention.

Formation of ester-bonds in reaction types 2 and 3 involves elimination of low molecular weight by-products such as water (reaction 2) or simple alcohols (reaction 3). Complete removal of the latter from reaction mixtures is generally somewhat easier than removal of the former. However, since the ester-bond forming reactions are generally reversible, it is necessary to "drive" the reactions forward in both instances by removing these by-products.

In practical terms, in the first stage (ester interchange) the reactants are mixed in appropriate proportions and are heated to provide a melt at atmospheric or slightly superatmospheric pressures (preferably of an inert gas such as nitrogen or argon). Water and/or low molecular weight alcohol is liberated and is distilled from the reactor at temperatures up to about 200° C. (A temperature range of from about 150°–200° C. is generally preferred for this stage).

In the second (i.e., oligomerization) stage, vacuum and temperatures somewhat higher than in the first stage are applied; removal of volatile by-products and excess reactants continues until the reaction is complete, as monitored by conventional spectroscopic techniques. Continuously applied vacuum, typically of about 10 mm Hg or lower can be used.

In both of the above-described reaction stages, it is necessary to balance on one hand the desire for rapid and complete reaction (higher temperatures and shorter times preferred), against the need to avoid thermal degradation (which undesirably might result in off-colors and by-products). It is possible to use generally higher reaction temperatures especially when reactor design minimizes super-heating or "hot spots"; also, ester-forming reactions in which ethylene glycol is present are more tolerant of higher temperatures. Thus, a suitable temperature for oligomerization lies most preferably in the range of from about 150° C. to about 260° C. when higher ratios of EG/PG are present and in the range of from about 150° C. to about 240° C. when lower ratios of EG/PG are present (assuming that no special precautions, such as of reactor design, are otherwise taken to limit thermolysis). When tetraalkylammonium cations are present, condensation temperatures are preferably 150°–240° C.

It is very important in the above-described procedure to use continuous mixing so that the reactants are always in good contact; highly preferred procedures involve formation of a well-stirred homogeneous melt of the reactants in the temperature ranges given above. It is also highly preferred to maximize the surface area of reaction mixture which is exposed to vacuum or inert gas to facilitate the removal of volatiles, especially in the oligomerization step; mixing equipment of a high-shear vortex-forming type giving good gas-liquid contact are best suited for this purpose.

Catalysts and catalyst levels appropriate for esterification, transesterification, oligomerization, and for combinations thereof are all well-known in polyester chemistry, and will generally be used herein; as noted above, a single catalyst will suffice. Suitably catalytic metals are reported in Chemical Abstracts, CA83:178505v, which states that the catalytic activity of transition metal ions during direct esterification of K and Na carboxybenzenesulfonates by ethylene glycol decreases in the order Sn (best), Ti, Pb, Zn, Mn, Co (worst).

The reactions can be continued over periods of time sufficient to guarantee completion, or various conventional analytical monitoring techniques can be employed to monitor progress of the forward reaction; such monitoring makes it possible to speed up the procedures somewhat and to stop the reaction as soon as a product having the minimum acceptable composition is formed. In general, when tetraalkylammonium cations are present, it is preferred to stop the reaction at less than full completion, relative to the sodium cation form, to reduce the possibility of thermal instability.

Appropriate monitoring techniques include measurement of relative and intrinsic viscosities, hydroxyl numbers, $^1$H and $^{13}$C nuclear magnetic resonance (n.m.r) spectra, capillary zone electrophoresis, and liquid chromatograms.

Most conveniently, when using a combination of volatile reactants (such as a glycol) and relatively involatile reactants (such as dimethyl terephthalate), the reaction will be initiated with excess glycol being present. As in the case of ester interchange reactions reported by Odian (op. cit.), "stoichiometric balance is inherently achieved in the last stages of the second step of the process". Excess glycol can be removed from the reaction mixture by distillation; thus, the exact amount used is not critical.

Inasmuch as the final stoichiometry of the ester composition depends on the relative proportions of reactants retained in the reaction mixtures and incorporated into the esters, it is desirable to conduct the condensations in a way which effectively retains the terephthaloyl-containing species and prevents them from distilling or subliming. Dimethyl terephthalate and to a lesser extent the simple glycol esters of terephthalic acid have sufficient volatility to show on occasion "sublimation" to cooler parts of the reaction apparatus. To ensure achieving the desired stoichiometry, it is desirable that this sublimate be returned to the reaction mixture or, alternatively, that sublimation losses be compensated by use of a small excess of terephthalate.

In general, sublimation-type losses, such as of dimethyl terephthalate, may be minimized 1) by apparatus design; 2) by raising the reaction temperature slowly enough to allow a large proportion of dimethyl terephthalate to be converted to less volatile glycol esters before reaching the upper reaction temperatures; 3) by conducting the early phase of the transesterification under low to moderate pressure (especially effective is a procedure allowing sufficient reaction time to evolve at least about 90% of the theoretical yield of methanol before applying vacuum); 4) by controlling vacuum during condensation to avoid use of pressures below about 20 mm Hg until the condensation has progressed to the point that most of the terephthalate is beyond the monomeric stage.

On the other hand, the "volatile" glycol components used herein must be truly volatile if an excess is to be used. In general, lower glycols or mixtures thereof having boiling points below about 350° C. at atmospheric pressure are used herein; these are volatile enough to be practically removable under typical reaction conditions.

Typically herein, when calculating the relative molar proportions of reactants to be used, the following routine is followed, as illustrated for a combination of the reactants sodium 2-[2-(2-hydroxyethoxy)ethoxy]ethanesulfonate (A), ethylene glycol (B), dimethyl terephthalate (C), and sulfoethyl ether of glycerin (D):

1. the desired degree of end-capping is selected; for the present example, the value 2 is used;

2. the average calculated number of terephthaloyl units in the backbone of the desired ester is selected; for the present example, the value 5, which falls in the range of most highly preferred values according to the invention, is used;

3. the average calculated number of sulfoethyl ether of glycerin units in the backbone of the desired ester is selected; for the present example, the value 1, which falls in the range of most highly preferred values according to the invention, is used;

4. the mole ratio of (A) to (C) to (D) should thus be 2:5:1; amounts of the reactants (A), (C), and (D) are taken accordingly;

5. an appropriate excess of glycol is selected; typically 2 to 10 times the sum of the number of moles of and dimethyl terephthalate is suitable.

The glycol used will be calculated in an amount sufficient to allow interconnection of all other units by means of ester bonds. Adding a convenient excess will usually result in a total relative amount of glycol ranging from about 1 to about 10 moles for each mole nonglycol organic reactants added together.

Note that when a mixture of oxyethyleneoxy and oxypropyleneoxy units in a particular ratio in the oligomer is desired, a somewhat lower molar ratio of EG:PG should be used as starting monomers to compensate for the greater volatility of the PG.

Finally, it may be desirable to also include a sulfonate-type hydrotrope or stabilizer, such as alkylbenzenesulfonate or toluenesulfonate, with the reactants during synthesis of the ester (or admixed with molten ester) to further reduce the risk of a crystallization problem. These stabilizer hydrotropes do not contain functionalities that allow them to form covalent bonds to the oligomer esters. If used, typically about 0.5% to about 20%, by weight of soil release agent, of sulfonate-type stabilizer is added to the soil release agent.

The following describes typical syntheses of the soil release agents herein.

Key to Examples:

SE2=HOCH2CH2OCH2CH2SO3Na
SE3=HOCH2CH2OCH2CH2OCH2CH2SO3Na
SE4=HOCH2CH2OCH2CH2OCH2CH2OCH2CH2SO3Na
SCEX=H(OCH2CH2)xCH2SO3Na
T=Dimethyl Terephthalate
SI=Dimethyl Sulfoisophthalate, monosodium salt
SEG=HOCH2CH(OH)CH2OCH2CH2SO3Na and (HOCH2)2CHOCH2CH2SO3Na
EG=Ethylene Glycol
PG=Propylene Glycol
G=Glycerol
GE1=HOCH2CH(OH)CH2OCH2CH2OH
GE2=Glycerol ethoxylated to an average degree of 2
TG=Triglycerol
TEG=Triethylene Glycol
BT=1,2,4-Butanetriol
THME=1,1,1-tris(hydroxymethyl)ethane
STS=Sodium Toluenesulfonate
LAS=Sodium C12 alkylbenzenesulfonate
SXS=Sodium xylenesulfonate
SCS=Sodium cumenesulfonate

EXAMPLE 1

Synthesis of Sodium 2-2,3-Dihydroxypropoxy) ethanesulfonate ("SEG") Monomer

To a 500 ml, three neck, round bottom flask equipped with a magnetic stirring bar, modified Claisen head, condenser (set for distillation), thermometer, and temperature controller (Therm-O-Watch™, I²R) is added isethionic acid, sodium salt (Aldrich, 50.0 g, 0.338 mol), sodium hydroxide (2.7 g, 0.0675 mol), and glycerine (Baker, 310.9 g, 3.38 mol). The solution is heated at 190° C. under argon overnight as water distills from the reaction mixture. A $^{13}$C-NMR(DMSO-d$_6$) shows that the reaction is complete by the virtual disappearance of the isethionate peaks at ~53.5 ppm and ~57.4 ppm, and the emergence of product peaks at ~51.4 ppm (—$\underline{C}$H$_2$SO$_3$Na) and ~67.5 ppm ($\underline{C}$H$_2$CH$_2$SO$_3$Na). The solution is cooled to ~100° C. and neutralized to pH 7 with methanesulfonic acid (Aldrich). The desired, neat material is obtained by adding 0.8 mol % of potassium phosphate, monobasic as buffer and heating on a Kugelrohr apparatus (Aldrich) at 200° C. for ~3 hrs. at ~1 mmHg to afford 77 g of yellow waxy solid. As an alternative, not all of the glycerin is removed before use in making the oligomers. The use of glycerin solutions of SEG can be a convenient way of handling the SEG monomer.

EXAMPLE 2

Synthesis of Sodium 2-[2-(2-Hydroxyethoxy) ethoxy]ethanesulfonate ("SE$_3$") Monomer To a 1 L, three neck, round bottom flask equipped with a magnetic stirring bar, modified Claisen head, condenser (set for distillation), thermometer, and temperature controller (Therm-O-Watch™, I2R) is added isethionic acid, sodium salt (Aldrich, 100.0 g 0.675 mol) and distilled water (~90 ml). After dissolution, one drop of hydrogen peroxide (Aldrich, 30% by wt. in water) is added to oxidize traces of bisulfite. The solution is stirred for one hour. A peroxide indicator strip shows a very weak positive test. Sodium hydroxide pellets (MCB, 2.5 g, 0.0625 mol) are added, followed by diethylene glycol (Fisher, 303.3 g, 2.86 mol). The solution is heated at 190° C. under argon overnight as water distills from the reaction mixture. A $^{13}$C-NMR (DMSO-d$_6$) shows that the reaction is complete by the disappearance of the isethionate peaks at ~53.5 ppm and ~57.4 ppm. The solution is cooled to room temperature and neutralized to pH 7 with 57.4 g of a 16.4% solution of p-toluenesulfonic acid monohydrate in diethylene glycol. (Alternatively, methanesulfonic acid may be used.) The $^{13}$C-NMR spectrum of the product shows resonances at ~51 ppm (—CH$_2$SO$_3$Na), ~60 ppm (—CH$_2$OH), and at ~69 ppm, ~72 ppm, and ~77 ppm for the remaining four methylenes. Small resonances are also visible for the sodium p-toluenesulfonate which formed during neutralization. The reaction affords 451 g of a 35.3% solution of sodium 2-[2-(2-hydroxyethoxy)ethoxy]ethanesulfonate in diethylene glycol. The excess diethylene glycol is removed by adding 0.8 mol % of monobasic potassium phosphate (Aldrich) as a buffer and heating on a Kugelrohr apparatus (Aldrich) at 150° C. for ~3 hrs. at ~1 mmHg to give the desired "SE$_3$" as an extremely viscous oil or glass.

EXAMPLE 3

Synthesis of Sodium 2-{2-[2-(2-Hydroxyethoxy) ethoxy]ethoxy}ethanesulfonate ("SE4") Monomer To a 1 L, three neck, round bottom flask equipped with a magnetic stirring bar, modified Claisen head, condenser (set for distillation), thermometer, and temperature controller (Therm-O-Watch™, I2R) is added isethionic acid, sodium salt (Aldrich, 205.0 g, 1.38 mol) and distilled water (~200 ml). After dissolution, one drop of hydrogen peroxide (Aldrich, 30% by wt. in water) is added to oxidize traces of bisulfite. The solution is stirred for one hour. A peroxide indicator strip shows a very weak positive test. Sodium hydroxide pellets (MCB, 5.5 g, 0.138 mol) are added, followed by triethylene glycol (Aldrich, 448.7 g, 3.0 mol). Optionally, the triethylene glycol can be purified by heating with strong base such as NaOH until color stabilizes and then distilling off the purified glycol for use in the synthesis. The solution is heated at 190° C. under argon overnight as water distills from the reaction mixture. A $^{13}$C-NMR (DMSO-d$_6$) shows that the reaction is complete by the disappearance of the isethionate peaks at ~53.5 ppm and ~57.4 ppm, and the emergence of product peaks at ~51 ppm (—CH$_2$SO$_3$Na), ~60 ppm (—CH$_2$OH), and at ~67 ppm, ~69 ppm, and ~72 ppm for the remaining methylenes. The solution is cooled to room temperature and neutralized to pH 7 with methanesulfonic acid (Aldrich). The reaction affords 650 g of a 59.5% solution of sodium 2-{2-[2-(2-hydroxyethoxy)ethoxy]ethoxy}ethanesulfonate in triethylene glycol. The excess triethylene glycol is removed by adding 0.8 mol % of monobasic potassium phosphate (Aldrich) as a buffer and heating on a Kugelrohr apparatus (Aldrich) at 180° C. for ~5.5 hrs. at ~1 mmHg to give the desired material as a brown solid. It is found that a more soluble buffer can be more effective in controlling pH during the stripping of excess triethylene glycol. One example of such a more soluble buffer is the salt of N-methylmorpholine with methanesulfonic acid. Alternatively, the pH can be controlled by frequent or continuous addition of acid such as methanesulfonic acid to maintain a pH near neutral during the stripping of excess glycol.

The material is believed to contain a low level of the disulfonate arising from reaction of both ends of the triethylene glycol with isethionate. However, the crude material is used without further purification as an anionic capping groups for polymer preparations.

Other preparations use a larger excess of triethylene glycol such as 5 to 10 moles per mole of isethionate.

EXAMPLE 4

Synthesis of an Equimolar Mixture of Sodium 2-[2-(2-Hydroxyethoxy)ethoxy]ethanesulfonate and Sodium 2-[2-(2-{2-Hydroxyethoxy}ethoxy)ethoxy] ethanesulfonate ("1:1 SE$_3$:SE$_4$") Monomers To a 500 ml, three neck, round bottom flask equipped with a magnetic stirring bar, modified Claisen head, condenser (set for distillation), thermometer, and temperature controller (Therm-O-Watch, I$^2$R) is added isethionic acid, sodium salt (Aldrich, 51.3 g, 0.346 mol), sodium hydroxide pellets (Baker, 1.7 g, 0.043 mol), triethylene glycol (Aldrich, 151.7 g, 1.04 mol), and diethylene glycol (Aldrich, 110.4 g, 1.04 mol). (Color generation during the synthesis may be reduced by using glycols free of color forming impurities. One way of accomplishing this is to pretreat the glycols with strong base at 100°–180° C. and then to distill out purified glycols. Another alternative is to pretreat the glycols with sodium borohydride.) The reaction mixture is heated at 190° C. under argon overnight as water distills from the reaction mixture. A $^{13}$C-NMR(DMSO-d$_6$) shows that the reaction is complete by the disappearance of the isethionate peaks at ~53.5 ppm and ~57.4 ppm, and the emergence &product peaks at ~51 ppm (—CH2SO3Na) and ~60 ppm (—CH2OH). The solution is cooled to room temperature and neutralized to pH 7 with methanesulfonic acid (Aldrich). The neat material is obtained by adding 2 mol % of potassium phosphate, monobasic (predissolved in water) and heating on a Kugelrohr apparatus (Aldrich) at 150° C. for ~4 hrs. at ~1 mmHg to afford 90 g of brown solid. Analysis indicates that a 0.96:1 molar ratio of SE$_3$:SE$_4$ has been achieved.

EXAMPLE 5

Co-Synthesis of Sodium 2-[2-(2-Hydroxyexthoxy) ethoxy]ethanesulfonate and Sodium 2-(2,3-Dihydroxypropoxy)ethanesulfonate in a ~2:1 Ratio ("SE3/SEG" Co-synthesis)

To a 500 ml, three neck, round bottom flask equipped with a magnetic stirring bar, modified Claisen head, condenser (set for distillation), thermometer, and temperature controller (Therm-O-Watch™, I$^2$R) is added isethionic acid, sodium salt (Aldrich, 30.0 g, 0.203 mol), sodium hydroxide (Baker, 1.6 g, 0.040 mol), diethylene glycol (Aldrich, 143.3 g, 1.35 mol), and glycerin (Baker, 62.2 g, 0.675 mol). The solution is heated at 190° C. under argon overnight as water distills from the reaction mixture. A $^{13}$C-NMR(DMSO-d$_6$) shows that the reaction is complete by the virtual disappearance of the isethionate peaks at ~53.5 ppm and ~57.4 ppm, and the emergence of a product peak at ~51.2 ppm (—CH$_2$SO$_3$Na). The solution is cooled to ~100° C. and neutralized to pH 7 with methanesulfonic acid (Aldrich). The mixture of sodium 2-[2-(2-hydroxyethoxy)ethoxy] ethanesulfonate and sodium 2-(2,3-dihydroxypropoxy) ethanesulfonate free of excess glycerin and diethylene glycol is obtained by adding 2 mol % of monobasic potassium phosphate and heating on a Kugelrohr apparatus (Aldrich) at 150° C. for ~4 hrs. at ~0.5 mmHg to afford 51 g of orange solid. Analysis of this material by capillary zone electrophoresis shows the mole ratio of sodium 2-[2-(2-hydroxyethoxy)ethoxy]ethanesulfonate to sodium 2-(2,3-dihydroxypropoxy)ethanesulfonate to be 2.2:1.

The preparation is repeated using a 1:1:1 mole ratio of diethylene glycol, triethylene glycol, and glycerin to obtain the desired approximately 1:1:1 mole ratio mixture of sodium 2-[2-(2-hydroxyethoxy)ethoxy]ethanesulfonate, sodium 2-{2-[2-(2-hydroxyethoxy)ethoxy]ethoxy}ethanesulfonate, and sodium 2-(2,3-dihydroxypropoxy)ethanesulfonate.

EXAMPLE 6

Synthesis of Sodium Alpha-3-Sulfopropyl-Omega-Hydroxy-Poly(oxy-1,2-ethanediyl), with Average Degree of Ethoxylation of 5 ("SCE6") Monomer a) Ethoxylation of Allyl Alcohol to a Degree of Ethoxylation of 5

To a 250 ml, three neck, round bottom flask equipped with a magnetic stirring bar, condenser, thermometer, and temperature controller (Therm-O-Watch®, $I^2R$) is added allyl alcohol (Aldrich, 24.5 g, 0.422 mol) under argon. Sodium metal (Aldrich, 0.78 g, 0.034 mol) is added in three increments. An exotherm occurs (~60° C.), and after the sodium is dissolved, the solution is heated to 80° C. Ethylene oxide gas is added via a sparging tube with rapid stirring. The temperature of the system is kept below 130° C. during the addition of ethylene oxide, which is stopped when a weight gain of 77.3 g, corresponding to 4.2 ethoxy units, is obtained. A $^1$H-NMR(CDCl$_3$) shows resonances for the allyl peaks at ~5.9 ppm (CH$_2$=C$\underline{H}$—), ~5.2 ppm (C$\underline{H}_2$=CH—), and ~4 ppm (CH2=CHC$\underline{H}_2$—), and a large resonance for the hydrogens from the ethoxy groups at ~3.5–3.8 ppm. Integration of these peaks indicates that the actual degree of ethoxylation is 5, suggesting that a little allyl alcohol is lost by volatilization during the ethoxylation. The material is neutralized to pH 7 with methanesulfonic acid (Aldrich). The resulting salt is removed by gravity filtration of the neat material.

b) Monosulfonation

To a 500ml erlenmeyer flask is added sodium bisulfite (Baker, 26.2 g, 0.251 mol), sodium hydroxide (Baker, 2.7 g, 0.068 mol), and distilled water (80 g). The pH of the resulting solution is ~6. The above allyl ethoxylate material (50.0 g, 0.180 mol) is added to the solution, and a two-phase system results. Distilled water (65 g) is added, and a homogenous solution is achieved. To this solution is added sodium persulfate (Aldrich, 6.5 g, 0.027 mol) dissolved in ~30 g of distilled water, and iron sulfate heptahydrate (Aldrich, 0.04 g, 0.00014 mol). A strong exotherm occurs, and the solution becomes light orange in color. After about 15 minutes, the solution becomes acidic and is neutralized with sodium hydroxide (Baker, 50% solution in water). (In similar preparations, it is sometimes found useful to incorporate a small amount of buffer to keep the pH from driving to the acidic side. Careful control of pH is necessary to minimize the formation of the less thermally stable sulfinate-sulfonate or disulfonate by-products.) The solution is stirred for 2 days at room temperature. A $^{13}$C-NMR(D$_2$O) shows the completeness of the reaction by the disappearance of the allyl ethoxylate peaks and the emergence of product peaks at ~24.6 ppm ($\underline{C}$H$_2$CH$_2$SO$_3$Na) and ~48.2 ppm ($\underline{C}$H$_2$SO$_3$Na), and with the retention of the peak at ~60.8 ppm ($\underline{C}$H$_2$OH). Small peaks for sulfinate-sulfonate functionality [—OCH$_2$CH(SO$_2$Na)CH$_2$SO$_3$Na] are also visible at ~44.4 ppm and ~62.9ppm. A small amount of hydrogen peroxide (Aldrich, 30% solution in water) is added to the solution to oxidize the small amount of sulfinate-sulfonate to a disulfonate and the excess bisulfite to bisulfate. After stirring overnight, a very weak positive test for peroxide (<0.5 ppm) is obtained with peroxide indicator strips. The water is removed under aspirator vacuum on a rotary evaporator at ~40° C. to precipitate the inorganic salts. Methanol (~1 volume) is added with mixing to form a slurry and the mixture is filtered. The filtrate is heated on the rotary evaporator at ~60° C. for one hour, followed by heating on the Kugelrohr at ~120° C. at about 1 mmHg for one hour, to afford 61 g of the desired sulfopropanol polyethoxylate as a light orange waxy solid. A $^1$H-NMR(CDCl$_3$) is taken with excess of the derivitizing agent trichloroacetyl isocyanate added. This allows for the comparison of the integrals of the methylene hydrogens close to sulfur (—C$\underline{H}_2$SO$_3$Na and —C$\underline{H}_2$CH$_2$SO$_3$Na) with the methylene hydrogens of the terminal ethoxy group (—C$\underline{H}_2$OH). A discrepancy is found, with the terminal methylene peak being ~42% larger in area than the other methylene peaks, indicating that there are more ethoxy groups than sulfonate groups. Integration of the terminal methylene peak gives a degree of ethoxylation of ~4.9, while using the area of the methylenes close to sulfur gives a degree of ethoxylation of ~6.5. Since the terminal hydroxymethylene group is thought to relate directly to the number of esterifiable sites, the material is used without further purification in polymer preparations as though the degree of ethoxylation is ~4.9 even though further analysis by mass spectroscopy indicates that there is some low molecular weight poly(ethylene glycol) present as a by-product.

EXAMPLE 7

Synthesis of Sodium Alpha-3-Sulfopropyl-Omega-Hydroxy-Poly(oxy-1,2-ethanediyl), with Average Degree of Ethoxylation of 3.5 ("SCE4.5") Monomer a) Ethoxylation of Allyl Alcohol To an oven-dried 250 ml, three neck, round bottom flask equipped with a magnetic stirring bar, dry ice condenser, thermometer, and temperature controller (Therm-O-Watch®, $I^2R$) is added allyl alcohol (Aldrich, 40.3 g, 0.694 mol) under argon. Sodium metal (Aldrich, 1.4 g, 0.061 mol) is added in three increments. An exotherm occurs (~60° C.), and after the sodium is dissolved, the solution is heated to 80° C. Ethylene oxide gas is added via a sparging tube with rapid stirring. The temperature of the system is kept below 130° C. during the addition of ethylene oxide, which is stopped when a weight gain of 87.3 g, corresponding to 2.9 ethoxy units per mole of original allyl alcohol, is obtained. A $^1$H-NMR(CDCl$_3$) shows resonances for the allyl peaks at ~5.9 ppm (CH$_2$=C$\underline{H}$—), ~5.2 ppm (C$\underline{H}_2$=CH—), and ~4 ppm (CH2=CHC$\underline{H}_2$—), and a large resonance for the hydrogens from the ethoxy groups at ~3.5–3.8 ppm. Analysis of the material gas chromatography-mass spectroscopy indicates the average degree of ethoxylation is actually 3.48. The material is neutralized to pH 7 with methanesulfonic acid (Aldrich). The resulting salt is removed by gravity filtration of the neat material and the clear allyl ethoxylate is used directly for radical catalyzed sulfonation.

B Monosulfonation

To a 500ml erlenmeyer flask is added sodium bisulfite (Baker, 42.0 g, 0.404 mol), sodium hydroxide (Baker, 12.7 g, 0.318 mol), potassium phosphate, monobasic (buffer; Aldrich, 5.2 g, 0.037 mol), and distilled water (80 g). The pH of the resulting solution is ~6. The above allyl ethoxylate material (60.0 g, 0.289 mol) is added to the solution, and a two-phase system results. Distilled water (100 g) is added, and a homogenous solution is achieved. To this solution is added sodium persulfate (Aldrich, 17.9 g, 0.075 mol) dissolved in 50 g of distilled water, and iron sulfate heptahydrate (Aldrich, 0.064 g, 0.00023 mol). [In other preparations the persulfate is added in small increments several minutes apart; this requires less total persulfate to complete the sulfonation.] A strong exotherm occurs, and the solution becomes light orange in color. After about 15 minutes, no pH change occurs. The solution is stirred for 2 hours. The pH of the solution at this time is ~4. The solution is neutralized with sodium hydroxide (Aldrich, 50% in water). A $^1$H-NMR (D$_2$O) shows the completeness of the reaction by the disappearance of the peaks for the allyl groups at ~5.2 ppm and ~5.9 ppm, and the emergence of product peaks at ~2.2 ppm (—CH$_2$CH$_2$SO$_3$Na) and ~3.2 ppm (—CH$_2$CH$_2$SO$_3$Na). A small amount of hydrogen peroxide (Aldrich, 30% solution in water) is added to the solution to oxidize the excess bisulfite to bisulfate and any traces of sulfinate groups to sulfonate groups. After stirring overnight, a very weak positive test for peroxide (<0.5 ppm) is obtained with peroxide indicator strips. The water is removed under aspirator vacuum on a rotary evaporator at ~60° C. to precipitate the inorganic salts. Chloroform (~1 volume) is added with mixing to form a slurry and the mixture is filtered. The filtrate is heated on the rotary evaporator at ~60° C. for one hour, followed by heating on the Kugelrohr at ~120° C. for one hour, to afford 65 g of the desired sulfopropanol polyethoxylate as a yellow waxy solid. A $^{13}$C-NMR(D$_2$O) shows product peaks at ~24.7 ppm (—CH$_2$SO$_3$Na), ~48.3 ppm (—CH$_2$CH$_2$SO$_3$Na), and ~60.8 ppm (—CH$_2$OH). A $^1$H-NMR(CDCl$_3$) is taken with the derivatizing agent trichloroacetylisocyanate added. This allows for the comparison of the integrals of the methylene hydrogens close to sulfur (—CH$_2$SO$_3$Na and —CH$_2$CH$_2$SO$_3$Na) with the hydrogens on the hydroxyl-bearing terminal methylene of the ethoxylate chain (—CH$_2$OH). A discrepancy is found, with the terminal methylene peak being larger in area than the other methylene peaks, indicating that there are more terminal hydroxyl groups than sulfonated groups. Using the terminal hydroxyl-bearing methylene peak area, a degree of ethoxylation of ~3.1 is obtained, while using the area of the methylenes close to sulfur gives a degree of ethoxylation of ~5.0. For use of this material in forming polymers, an intermediate degree of ethoxylation, 3.5, which agrees with the degree of ethoxylation documented at the allyl ethoxylate stage is used for calculating the molecular weight. That is, the average composition used for molecular weight calculation is H(OCH$_2$CH$_2$)$_{3.5}$OCH$_2$CH$_2$CH$_2$SO$_3$Na.

EXAMPLE 8

Synthesis of an Oligomer of Sodium Alpha-3-Sulfopropyl-Omega-Hydroxy-Poly(oxy-1,2-ethanediyl), with Average Degree of Ethoxylation of 3.5, ("SCE4.5"), Dimethyl Terephthalate, Sodium 2-(2,3-Dihydroxypropoxy)ethanesulfonate, Glycerin, Ethylene Glycol, Propylene Glycol ("2SCE$_{4.5}$ 4PE/PT, 1SEG, 2G")

To a 250 ml, three neck, round bottom flask equipped with a magnetic stirring bar, modified Claisen head, condenser (set for distillation), thermometer, and temperature controller (Therm-O-Watch, I2R) is added sodium alpha-3-sulfopropyl-omega-hydroxy-poly(oxy-1,2-ethanediyl), with average degree of ethoxylation of 3.5, ("SCE$_{4.5}$") (8.0 g, 0.025 mol) as in Example 6, dimethyl terephthalate (9.8 g, 0.050 mol), sodium 2-(2,3-dihydroxypropoxy)ethanesulfonate (2.3 g, 0.013 mol), glycerin (Baker, 1.2 g, 0.013 mol) ethylene glycol (Baker, 11.7 g, 0.189 mol), propylene glycol (Baker, 14.7 g, 0.193 mol), and titanium (IV) propoxide (Aldrich, 0.01 g, 0.02% of total reaction weight). This mixture is heated to 180° C. and maintained at that temperature overnight under argon as methanol distills from the reaction vessel. The material is transferred to a 250 ml, single neck, round bottom flask and heated gradually over about 20 minutes to 240° C. in a Kugelrohr apparatus (Aldrich) at about 0.5 mm Hg and maintained there for 1.5 hours. The reaction flask is then allowed to air cool quite rapidly to near room temperature under vacuum (~30 min.) The reaction affords 14.3 g of the desired oligomer as a brown glass. A $^{13}$C-NMR(DMSO-d$_6$) shows a resonance for —C(O)OCH2CH2O(O)C— at ~63.2 ppm (diester). A resonance for —C(O)OCH2CH2OH at ~59.4 ppm (monoester) is not detectable and is at least 14 times smaller than the diester peak. A resonance at ~51.0 ppm representing the sulfoethoxy capping group (—CH2SO3Na) is also present. A $^1$H-NMR(DMSO-d$_6$) shows a resonance ~7.9 ppm representing terephthalate aromatic hydrogens. Analysis of this material by hydrolysis-gas chromatography indicates that the ratio of incorporated ethylene glycol to propylene glycol is 1.5:1. The solubility is tested by weighing a small amount of material into a vial, adding enough distilled water to make a 35% by weight solution, and agitating the vial vigorously. The material is readily soluble under these conditions.

EXAMPLE 9

Synthesis of an Oligomer of Sodium 2-[2-(2-Hydroxyethoxy)ethoxy]ethanesulfonate, Dimethyl Terephthalate, 2-(2,3-Dihydroxypropoxy) ethanesulfonate, Glycerin, Ethylene Glycol, and Propylene Glycol ("2SE3 5PE/PT, 1SEG, 1G (E/P= 1.7)")

To a 250 ml, three neck, round bottom flask equipped with a magnetic stirring bar, modified Claisen head, condenser (set for distillation), thermometer, and temperature controller (Therm-O-Watch®, I2R) is added sodium 2-[2-(2-hydroxyethoxy)ethoxy]ethanesulfonate (7.0 g, 0.030 mol), dimethyl terephthalate (14.4 g, 0.074 mol), 2-(2,3-dihydroxypropoxy)ethanesulfonate (3.3 g, 0.015 mol), glycerin (Baker, 1.4 g, 0.015 mol), ethylene glycol (Baker, 14.0 g, 0.225 mol), propylene glycol (Fisher, 17.5 g, 0.230 mol), and titanium (IV) propoxide (0.01 g, 0.02% of total reaction weight). This mixture is heated to 180° C. and maintained at that temperature overnight under argon as methanol and water distill from the reaction vessel. The material is transferred to a 500 ml, single neck, round bottom flask and heated gradually over about 20 minutes to 240° C. in a Kugelrohr apparatus (Aldrich) at about 2 mm Hg and maintained there for 1.5 hours. The reaction flask is then allowed to air cool quite rapidly to near room temperature under vacuum (~30 min.) The reaction affords 21.3 g of the desired oligomer as a brown glass. A $^{13}$C-NMR(DMSO-d$_6$) shows a resonance for —C(O)OCH2CH2O(O)C— at ~63.2 ppm (diester) and a resonance for —C(O)OCH2CH2OH at ~59.4 ppm (monoester). The ratio of the diester peak height to the monoester peak height is about 10. Resonances at ~51.5 ppm and ~51.6 ppm representing the sulfoethoxy groups (—CH2SO3Na) are also present. A $^1$H-NMR (DMSO-d$_6$) shows a resonance at ~7.9 ppm representing terephthalate aromatic hydrogens. Analysis by hydrolysis-gas chromatography shows that the mole ratio of incorporated ethylene glycol to incorporated propylene glycol is 1.7:1. It also shows that about 0.9% of the final polymer weight consists of glycerin. If all glycerin monomers have been incorporated as esters of glycerin, it would represent approximately 4% of final oligomer weight. The solubility is tested by weighing a small amount of material into a vial, adding enough distilled water to make a 35% by weight solution, and agitating the vial vigorously. The material is readily soluble under these conditions.

EXAMPLE 10

Synthesis of an Oligomer of Sodium 2-[2-(2-Hydroxyethoxy)ethoxy]ethanesulfonate, Dimethyl Terephthalate, Sodium 2-(2,3-Dihydroxypropoxy) ethanesulfonate, Ethylene Glycol, and Propylene Glycol ("2SE3 5PE/PT, 2SEG (E/P=1.6) (CI=8)")

To a 250 ml, three neck, round bottom flask equipped with a magnetic stirring bar, modified Claisen head, condenser (set for distillation), thermometer, and temperature controller (Therm-O-Watch®, $I^2R$) is added sodium 2-[2-(2-hydroxyethoxy)ethoxy]ethanesulfonate (7.0 g, 0.030 mol), dimethyl terephthalate (14.4 g, 0.074 mol), sodium 2-(2,3-dihydroxypropoxy)ethanesulfonate (6.6 g, 0.030 mol), ethylene glycol (Baker, 14.0 g, 0.225 mol), propylene glycol (Fisher, 18.3 g, 0.240 mol), and titanium (IV) propoxide (0.01 g, 0.02% of total reaction weight). This mixture is heated to 180° C. and maintained at that temperature overnight under argon as methanol distills from the reaction vessel. The material is transferred to a 500 ml, single neck, round bottom flask and heated gradually over about 20 minutes to 240° C. in a Kugelrohr apparatus (Aldrich) at about 0.1 mm Hg and maintained there for 110 minutes. The reaction flask is then allowed to air cool quite rapidly to near room temperature under vacuum (~30 min.) The reaction affords 24.4 g of the desired oligomer as a brown glass. A $^{13}$C-NMR(DMSO-d$_6$) shows a resonance for —C(O)O$\underline{C}$H2CH2O(O)C— at ~63.2 ppm (diester) and a resonance for —C(O)O$\underline{C}$H2CH2OH at ~59.4 ppm (monoester). The ratio of the diester peak to monoester peak is measured to be 8. Resonances at ~51.5 ppm and ~51.6 ppm representing the sulfoethoxy groups (—$\underline{C}$H2SO3Na) are also present. A $^1$H-NMR(DMSO-d$_6$) shows a resonance at ~7.9 ppm representing terephthalate aromatic hydrogens. Analysis by Hydrolysis-GC shows that the mole ratio of incorporated ethylene glycol to incorporated propylene glycol is 1.6:1. The solubility is tested by weighing a small amount of material into a vial, adding enough distilled water to make a 35% by weight solution, and agitating the vial vigorously. The material is readily soluble under these conditions.

EXAMPLE 11

Synthesis of an Oligomer of Sodium 2-[2-(2-Hydroxyethoxy)ethoxy]ethanesulfonate, Dimethyl Terephthalate, Sodium 2-(2,3-Dihydroxypropoxy) ethanesulfonate, Glycerin, Ethylene Glycol, and Propylene Glycol ("3SE3 5PE/PT, 1SEG, 2G (E/P=1.6)")

To a 250 ml, three neck, round bottom flask equipped with a magnetic stirring bar, modified Claisen head, condenser (set for distillation), thermometer, and temperature controller (Therm-O-Watch®, $I^2R$) is added sodium 2-[2-(2-hydroxyethoxy)ethoxy]ethanesulfonate (7.0 g, 0.030 mol), dimethyl terephthalate (9.6 g, 0.049 mol), sodium 2-(2,3-dihydroxypropoxy)ethanesulfonate (2.2 g, 0.010 mol), glycerin (Baker, 1.8 g, 0.020 mol), ethylene glycol (Baker, 6.1 g, 0.100 mol), propylene glycol (Fisher, 7.5 g, 0.100 mol), and titanium (IV) propoxide (0.01 g, 0.02% of total reaction weight). This mixture is heated to 180° C. and maintained at that temperature overnight under argon as methanol distills from the reaction vessel. The material is transferred to a 250 ml, single neck, round bottom flask and heated gradually over about 20 minutes to 240° C. in a Kugelrohr apparatus (Aldrich) at about 3 mm Hg and maintained there for 1.5 hours. The reaction flask is then allowed to air cool quite rapidly to near room temperature under vacuum (~30 min.) The reaction affords 18.1 g of the desired oligomer as a brown glass. A $^{13}$C-NMR(DMSO-d$_6$) shows a resonance for —C(O)O$\underline{C}$H2$\underline{C}$H2O(O)C— at ~63.2 ppm (diester). A resonance for —C(O)O$\underline{C}$H2CH2OH at ~59.4 ppm (monoester) is not detectable and is at least 12 times smaller than the diester peak. Resonances at ~51.5 ppm and ~51.6 ppm representing the sulfoethoxy groups (—$\underline{C}$H2SO3Na) are also present. A $^1$H-NMR(DMSO-d$_6$) shows a resonance at ~7.9 ppm representing terephthalate aromatic hydrogens. Analysis by Hydrolysis-GC shows that the mole ratio of incorporated ethylene glycol to incorporated propylene glycol is 1.6:1. The incorporated glycerin is found to be 0.45 weight % of the final polymer. The solubility is tested by weighing a small amount of material into a vial, adding enough distilled water to make a 35% by weight solution, and agitating the vial vigorously. The material is readily soluble under these conditions.

EXAMPLE 12

Synthesis of an Oligomer of Sodium 2-[2-(2-Hydroxyethoxy)ethoxy]ethanesulfonate, Dimethyl Terephthalate, Sodium 2-(2,3-Dihydroxypropoxy) ethanesulfonate, Glycerol, Ethylene Glycol, and Propylene Glycol ("2SE3 11PE/PT, 4SEG, 1G (E/P=1.42)")

To a 250 ml, three neck, round bottom flask equipped with a magnetic stirring bar, modified Claisen head, condenser (set for distillation), thermometer, and temperature controller (Therm-O-Watch®, $I^2R$) is added sodium 2-[2-(2-hydroxyethoxy)ethoxy]ethanesulfonate (2.7 g, 0.011 mol, as in Example 2), dimethyl terephthalate (12.0 g, 0.062 mol, Aldrich), sodium 2-(2,3-dihydroxypropoxy)ethanesulfonate (5.0 g, 0.022 mol, as in Example 1), glycerol (Baker, 0.50 g, 0.0055 mol), ethylene glycol (Baker, 6.8 g, 0.110 mol), propylene glycol (Baker, 8.5 g, 0.112 mol), and titanium (IV) propoxide (0.01 g, 0.02% of total reaction weight). This mixture is heated to 180° C. and maintained at that temperature overnight under argon as methanol and water distill from the reaction vessel. The material is transferred to a 500 ml, single neck, round bottom flask and heated gradually over about 20 minutes to 240° C. in a Kugelrohr apparatus (Aldrich) at about 0.5 mm Hg and maintained there for 150 minutes. The reaction flask is then allowed to air cool quite rapidly to near room temperature under vacuum (~30 min.) The reaction affords 16.7 g of the desired oligomer as a brown glass. A $^{13}$C-NMR(DMSO-d$_6$) shows a resonance for —C(O)O$\underline{C}$H2$\underline{C}$H2O(O)C— at ~63.2 ppm (diester) and a resonance for —C(O)O$\underline{C}$H2CH2OH at ~59.4 ppm (monoester). The ratio of the peak height for the diester resonance to that of the monoester resonance is measured to be 6.1. Resonances at ~51.5 ppm and ~51.6 ppm representing the sulfoethoxy groups (—$\underline{C}$H2SO3Na) are also present. A $^1$H-NMR(DMSO-d$_6$) shows a resonance at ~7.9 ppm representing terephthalate aromatic hydrogens. Analysis by hydrolysis-gas chromatography shows that the mole ratio of incorporated ethylene glycol to incorporated propylene glycol is 1.42:1. The solubility is tested by weighing a small amount of material into a vial, adding enough distilled water to make a 35% by weight solution, and agitating the vial vigorously. The material is readily soluble under these conditions. A ~9 g sample of this material is further heated at 240° C. in a Kugelrohr apparatus at about 0.5 mm Hg and maintained there for 80 minutes. A $^{13}$C-NMR(DMSO-d$_6$)

shows no detectable peak for monoester at ~59.4ppm. The peak for diester at ~63.2 ppm is at least 11 times larger than the monoester peak. The solubility of this material is tested as above and it is also found to be readily soluble under these conditions.

EXAMPLE 13

Synthesis of an Oligomer of Sodium 2-[2-(2-Hydroxyethoxy)ethoxy]ethanesulfonate, Dimethyl Terephthalate, Sodium 2-(2,3-Dihydroxypropoxy) ethanesulfonate, Glycerol, and Ethylene Glycol ["2SE$_3$ 5PET, 1SEG, 1G+12% Hydrotropes (E/P~1.7)"]

To a 250 ml, three neck, round bottom flask equipped with a magnetic stirring bar, modified Claisen head, condenser (set for distillation), thermometer, and temperature controller (Therm-O-Watch®, I$^2$R) is added sodium 2-[2-(2-hydroxyethoxy)ethoxy]ethanesulfonate (7.0 g, 0.030 mol, as in Example 2), dimethyl terephthalate (14.4 g, 0.074 mol, Aldrich), sodium 2-(2,3-dihydroxypropoxy)ethanesulfonate (3.3 g, 0.015 mol, as in Example 1), glycerol (1.4 g, 0.015 mol, Baker), ethylene glycol (27.9 g, 0.450 mol, Baker), sodium toluenesulfonate (1.0 g, 4 wt. % of polymer, Ruetgers-Nease), sodium cumenesulfonate (1.0 g, 4 wt. % of polymer, Ruetgers-Nease), sodium xylenesulfonate (1.0 g, 4 wt. % of polymer, Ruetgers-Nease), and titanium (IV) propoxide (0.01 g, 0.02% of total reaction weight, Aldrich). This mixture is heated to 180° C. and maintained at that temperature overnight under argon as methanol distills from the reaction vessel. The material is transferred to a 500 ml, single neck, round bottom flask and heated gradually over about 20 minutes to 240° C. in a Kugelrohr apparatus (Aldrich) at about 0.4 mm Hg and maintained there for 150 minutes. The reaction flask is then allowed to air cool quite rapidly to near room temperature under vacuum (~30 min.) The reaction affords 22.4 g of the desired oligomer as a brown opaque solid. A $^{13}$C-NMR(DMSO-d$_6$) shows a resonance for —C(O)OCH2CH2O(O)C— at ~63.2 ppm (diester) and a resonance for —C(O)OCH2CH2OH at ~59.4 ppm (monoester). The ratio of the peak height for the diester resonance to that of the monoester resonance is measured to be 15. Resonances at ~51.5 ppm and ~51.6 ppm representing the sulfoethoxy groups (—CH2SO3Na) are also present. A $^1$H-NMR(DMSO-d$_6$) shows a resonance at ~7.9 ppm representing terephthalate aromatic hydrogens. The solubility is tested by weighing a small amount of material into a vial, adding enough distilled water to make a 35% by weight solution, and agitating the vial vigorously. The material is readily soluble under these conditions. The solution is very thick and almost gelled in about 3 hours.

EXAMPLE 14

Synthesis of an Oligomer of Sodium 2-[2-(2-Hydroxyethoxy)ethoxy]ethanesulfonate, Sodium 2-[2-(2-{2-Hydroxyethoxy)ethoxy]ethoxy}ethanesulfonate, Dimethyl Terephthalate, Sodium 2-(2,3-Dihydroxypropoxy)ethanesulfonate, Glycerol, Propylene Glycol, and Ethylene Glycol ["SE$_{3.5}$ 5.5PE/PT, 2.5SEG, 0.5G (E/P=1.70)"]

To a 500 ml, three neck, round bottom flask equipped with a magnetic stirring bar, modified Claisen head, condenser (set for distillation), thermometer, and temperature controller (Therm-O-Watch®, I$^2$R) is added sodium 2-[2-(2-hydroxyethoxy)ethoxy]ethanesulfonate (8.0 g, 0.034 mol), sodium 2-[2-(2-{2-hydroxyethoxy)ethoxy]ethoxy}ethanesulfonate (9.5 g, 0.034 mol), dimethyl terephthalate (36.2 g, 0.186 mol), sodium 2-(2,3-dihydroxypropoxy)ethanesulfonate (18.8 g, 0.085 mol), glycerol (Baker, 1.6 g, 0.017 mol), ethylene glycol (Baker, 31.7 g, 0.511 mol), propylene glycol (Baker, 39.6 g, 0.520 mol), and titanium (IV) propoxide (0.03 g, 0.02% of total reaction weight). This mixture is heated to 180° C. and maintained at that temperature overnight under argon as methanol distills from the reaction vessel. A 35 g portion of this material is transferred to a 250 ml, single neck, round bottom flask and heated gradually over about 10 minutes to 180° C. in a Kugelrohr apparatus (Aldrich) at about 50 mm Hg and maintained there for 30 minutes, after which the temperature is raised to 230° C. for 1 hr. The vacuum is then increased to about 1 mm Hg, and heating at 230° C. is continued for 2.5 hrs. The reaction flask is allowed to air cool quite rapidly to near room temperature under vacuum (~30 min.). The reaction affords 17.9 g of the desired oligomer as a brown glass. A $^{13}$C-NMR(DMSO-d$_6$) shows a resonance for —C(O)OCH2CH2O(O)C— at ~63.2 ppm (diester) and a resonance for —C(O)OCH2CH2OH at ~59.4 ppm (monoester). The ratio of the peak height for the diester resonance to that of the monoester resonance is measured to be 10. Resonances at ~51.5 ppm and ~51.6 ppm representing the sulfoethoxy groups (—CH2SO3Na) are also present. A $^1$H-NMR(DMSO-d$_6$) shows a resonance at ~7.9 ppm representing terephthalate aromatic hydrogens. Analysis by Hydrolysis-GC shows that the mole ratio of incorporated ethylene glycol to incorporated propylene glycol is 1.70:1 The solubility is tested by weighing a small amount of material into a vial, adding enough distilled water to make a 35% by weight solution, and agitating the vial vigorously. The material is readily soluble under these conditions.

The above procedure is repeated except that 39.5 g, 0.203 moles dimethyl terephthalate and 0.96 g, 0.010 moles of glycerol are used. The desired polymer with a theoretical average of 6 terephthalates per molecule is obtained.

EXAMPLES 15–40

Oligomers of Examples 15–40 are prepared by methods described above using the indicated moles of reactants.

| Example # | Cap (Moles) | Moles T | Moles EG | Moles PG | Moles G | Moles SEG | Other (Moles) |
|---|---|---|---|---|---|---|---|
| 15 | SE3(2) | 5 | 15 | 16 | 0 | 1.5 | 0 |
| 16 | SE4(2) | 5 | 15 | 15.3 | 1 | 2 | 0 |
| 17 | SE3(2) | 11 | 15 | 15.2 | 0 | 4 | 0 |
| 18 | SE3(2) | 7 | 15 | 15.3 | 1 | 3 | 0 |
| 19 | SE3(2) | 5 | 15 | 15.3 | 1 | 1 | TEG(1) |
| 20 | SE3(2) | 5 | 15 | 15.3 | 1 | 1 | 0 |
| 21 | SE3(2) | 5 | 15 | 16 | 0 | 1 | 0 |
| 22 | SE3(2) | 5 | 15 | 16 | 0 | 2 | 0 |
| 23 | SE3(2) | 5 | 15 | 15.3 | 2 | 1 | 0 |

-continued

| Example # | Cap (Moles) | Moles T | Moles EG | Moles PG | Moles G | Moles SEG | Other (Moles) |
|---|---|---|---|---|---|---|---|
| 24 | SE3(2) | 6 | 15 | 15.3 | 1 | 2 | SI(1) |
| 25 | SE3(3) | 5 | 10 | 10 | 2 | 1 | 0 |
| 26* | SE2(2) | 5 | 15 | 15.3 | 1 | 1 | 0 |
| 27 | SCE6(2) | 5 | 15 | 15.1 | 1 | 2 | 0 |
| 28 | SE3(2) | 11 | 20 | 20.4 | 0 | 5 | 0 |
| 29 | SPE3(2) | 5 | 15 | 15.3 | 1 | 1 | 0 |
| 30 | SCE4.5(2) | 5 | 15 | 15.3 | 1 | 2 | 0 |
| 31 | SE3(2) | 4 | 15 | 15.3 | 0 | 1 | TG(0.11) |
| 32** | SE2(3) | 3 | 8 | 7 | 1 | 0 | 0 |
| 33* | SE2(3) | 3 | 7.9 | 7 | 3 | 0 | 0 |
| 34* | SE2(3) | 3 | 7.8 | 6.9 | 0 | 0 | GE1(1) |
| 35** | SE2(3) | 3 | 9 | 8 | 0 | 0 | BT(1) |
| 36* | SE2(3) | 3 | 7.8 | 6.9 | 0 | 0 | GE2(1) |
| 37* | SE2(3) | 3 | 9 | 8 | 0 | 0 | THME(1) |
| 38 | SE3.5(2)# | 5 | 15 | 16 | 0.3 | 2.5 | 0 |
| 39 | SE3(1)SE4(1)## | 5 | 15 | 16 | 0.3 | 2.5 | 0 |
| 40 | SE3(3) | 5 | 15 | 16 | 2 | 1 | 0 |

*Contains 12% STS additive.
**Contains 12% LAS additive.
SE3.5 synthesized directly from 1:1 diethylene glycol:triethylene glycol with isethionate.
SE3 and SE4 synthesized separately and added to the polymerization reaction in 1:1 ratio.

Test Method—The following test method can be used to determine "completion index" of the s.r.a.'s of the invention.

1. The s.r.a. is well mixed as a melt to ensure representative sampling and is cooled rapidly from temperature above the melting-point to well below the vitrification temperature, e.g., 45° C. or lower.
2. A solid sample of the bulk s.r.a. is taken.
3. A 10% solution of the s.r.a. in (methyl sulfoxide)-$d_6$ containing 1% v/v tetramethylsilane (Aldrich Chemical Co.) is made up. If necessary, warming to 90°–100° C. is used to achieve substantially complete dissolution of the s.r.a.
4. The solution is placed in a 180×5 mm NMR tube (Wilmad Scientific Glass, 507-pp-7 Royal Imperial thin-walled 5 mm NMR sample tubes, 8".)
5. The $^{13}C$ NMR spectrum is obtained under the following conditions:
   a. General Electric QE-300 NMR instrument
   b. probe temperature=25° C.
   c. one pulse sequence
   d. pulse width=6.00 microseconds
      =30 degree
   e. acquisition time=819.20 msec
   f. recycle time=1.00 sec
   g. no. of acquisitions=5000
   h. data size=32768
   i. line broadening=3.00 Hz
   j. spin rate=13 rps
   k. observe:
      frequency=75.480824 MHz
      spec width=20,000 Hz
      gain=60*8
   l. decoupler:
      standard broad band, 64 modulation
      frequency=4.000 ppm
      power=2785/3000
   m. plot scale:
      510.64 Hz/cm
      6.7652 ppm/cm
      from 225.00 to −4.99 ppm
6. The height of the tallest resonance observed in the 63.0–63.8 ppm region (referred to as "the 63 peak" and associated with diesters of ethylene glycol) is measured. (This is often observed as a single peak under the specified conditions but may appear as a poorly resolved muitiplet).
7. The height of the resonance observed at 58.9 ppm (referred to as "the 60 peak") and associated with monoesters of ethylene glycol is measured. (When this is large enough to distinguish from the baseline, it normally appears to be a single peak under the specified conditions.)
8. The completion index is calculated as the height ratio for the "63 peak" over the "60 peak".

Use of Esters of the Invention as Soil-Release Agents—Esters of the invention are especially useful as soil release agents of a type compatible in the laundry with conventional detergent ingredients such as those found in granular or liquid laundry detergents. Additionally, the esters are useful in laundry additive or pretreatment compositions comprising the essential soil release agents and optional detergent ingredients. The soil release agents, as provided herein, will typically constitute at least about 0.01%, preferably from about 0.1% to about 10%, most preferably from about 0.1% to about 3.0% by weight of detergent.

Detersive Surfactant—Detersive surfactants included in the fully-formulated detergent compositions afforded by the present invention comprises at least 1%, preferably from about 1% to about 99.8%, by weight of detergent composition depending upon the particular surfactants used and the effects desired. In a highly preferred embodiment, the detersive surfactant comprises from about 5% to about 80% by weight of the composition.

The detersive surfactant can be nonionic, anionic, ampholytic, zwitterionic, or cationic. Mixtures of these surfactants can also be used. Preferred detergent compositions comprise anionic detersive surfactants or mixtures of anionic surfactants with other surfactants, especially nonionic surfactants.

Nonlimiting examples of surfactants useful herein include the conventional $C_{11}$–$C_{18}$ alkyl benzene sulfonates and primary, secondary and random alkyl sulfates, the $C_{10}$–$C_{18}$ alkyl alkoxy sulfates, the $C_{10}$–$C_{18}$ alkyl polyglycosides and their corresponding sulfated polyglycosides, $C_{12}$–$C_{18}$ alpha-sulfonated fatty acid esters, $C_{12}$–$C_{18}$ alkyl and alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like. Other conventional useful surfactants are listed in standard texts.

One class of nonionic surfactant particularly useful in detergent compositions of the present invention is condensates of ethylene oxide with a hydrophobic moiety to provide a surfactant having an average hydrophilic-lipophilic balance (HLB) in the range of from 5 to 17, preferably from 6 to 14, more preferably from 7 to 12. The hydrophobic (lipophilic) moiety may be aliphatic or aromatic in nature. The length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol, the C12–$C_{15}$ primary alcohols containing 3–5 moles of ethylene oxide per mole of alcohol, and mixtures thereof.

Another suitable class of nonionic surfactants comprises the polyhydroxy fatty acid amides of the formula:

$$R^2C(O)N(R^1)Z$$

wherein: $R^1$ is H, $C_1$–$C_8$ hydrocarbyl, 2-hydroxyethyl, 2-hydroxypropyl, or a mixture thereof, preferably $C_1$–$C_4$ alkyl, more preferably $C_1$ or $C_2$ alkyl, most preferably $C_1$ alkyl (i.e., methyl); and $R^2$ is a $C_5$–$C_{32}$ hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Z is a polyhydroxyhydrocarbyl moiety having a linear hydrocarbyl chain with at least 2 (in the case of glyceraldehyde) or at least 3 hydroxyls (in the case of other reducing sugars) directly connected to the chain, or an alkoxylated derivative (preferably ethoxylated or propoxylated) thereof. Z preferably will be derived from a reducing sugar in a reductive amination reaction; more preferably Z is a glycityl moiety. Suitable reducing sugars include glucose, fructose, maltose, lactose, galactose, mannose, and xylose, as well as glyceraldehyde. As raw materials, high dextrose corn syrup, high fructose corn syrup, and high maltose corn syrup can be utilized as well as the individual sugars listed above. These corn syrups may yield a mix of sugar components for Z. It should be understood that it is by no means intended to exclude other suitable raw materials. Z preferably will be selected from the group consisting of —$CH_2$—$(CHOH)_n$—$CH_2OH$, —CH$(CH_2OH)$—$(CHOH)_{n-1}$—$CH_2OH$, —$CH_2$—$(CHOH)_2$(CHOR')(CHOH)—$CH_2OH$, where n is an integer from 1 to 5, inclusive, and R' is H or a cyclic mono- or polysaccharide, and alkoxylated derivatives thereof. Most preferred are glycityls wherein n is 4, particularly —$CH_2$—$(CHOH)_4$—$CH_2OH$.

In Formula (I), $R^1$ can be, for example, N-methyl, N-ethyl, N-propyl, N-isopropyl, N-butyl, N-isobutyl, N-2-hydroxy ethyl, or N-2-hydroxy propyl. For highest sudsing, $R^1$ is preferably methyl or hydroxyalkyl. If lower sudsing is desired, $R^1$ is preferably $C_2$–$C_8$ alkyl, especially n-propyl, iso-propyl, n-butyl, iso-butyl, pentyl, hexyl and 2-ethyl hexyl.

$R^2$—CO—N< can be, for example, cocamide, stearamide, oleamide, lauramide, myristamide, capricamide, palmitamide, tallowamide, etc.

Detersive Builders—Optional detergent ingredients employed in the present invention contain inorganic and/or organic detersive builders to assist in mineral hardness control. If used, these builders comprise at least 1%, preferably from about 5% to about 80%, by weight of the detergent compositions.

Inorganic detersive builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales.

Examples of silicate builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck, available from Hoechst under the trademark "SKS"; SKS-6 is an especially preferred layered silicate builder.

Aluminosilicate builders are especially useful in the present invention. Preferred aluminosilicates are zeolite builders which have the formula:

$$Na_z[(AlO_2)_z(SiO_2)_y]\cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. Methods for producing aluminosilicate ion exchange materials are disclosed in U.S. Pat. No. 3,985,669, Krummel, et al, issued Oct. 12, 1976, and U.S. Pat. No. 4,605,509, Corkill, et al, issued Aug. 12, 1986. Preferred synthetic crystalline aluminosilicate ion exchange materials useful herein are available under the designations Zeolite A, Zeolite P (B), (including those disclosed in EPO 384,070), and Zeolite X. Preferably, the aluminosilicate has a particle size of about 0.1–10 microns in diameter.

Organic detersive builders suitable for the purposes of the present invention include, but are not restricted to, a wide variety of polycarboxylate compounds, such as ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987.

Other useful detersive builders include the ether hydroxypolycarboxylates, copolymers of maleic anhydride with ethylene or vinyl methyl ether, 1,3,5-trihydroxybenzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are preferred polycarboxylate builders that can also be used in granular compositions, especially in combination with zeolite and/or layered silicate builders.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Optional Detersive Adjuncts—As a preferred embodiment, the conventional detergent ingredients employed herein can be selected from typical detergent composition components such as detersive surfactants and detersive builders. Optionally, the detergent ingredients can include one or more other detersive adjuncts or other materials for assisting or enhancing cleaning performance, treatment of the substrate to be cleaned, or to modify the aesthetics of the detergent composition. Usual detersive adjuncts of detergent compositions include the ingredients set forth in U.S. Pat. No. 3,936,537, Baskerville et at. Adjuncts which can also be included in detergent compositions employed in the present invention, in their conventional art-established levels for use (generally from 0% to about 20% of the detergent ingredients, preferably from about 0.5% to about 10%), include enzymes, especially proteases, lipases, and cellulases, color speckles, suds boosters, suds suppressors, antitarnish and/or anticorrosion agents, soil-suspending agents, dyes, fillers, optical brighteners, germicides, alkalinity sources, hydrotropes, anti-oxidants, enzyme stabilizing agents, perfumes, solvents, solubilizing agents, clay soil removal/anti-redeposition agents, polymeric dispersing agents, dye transfer inhibiting agents, including polyamine N-oxides such as polyvinylpyrrolidone and copolymers of N-vinyl imidazole and N-vinyl pyrrolidone, processing aids, fabric softening components, static control agents, etc.

Bleaching Agents—Optionally, the detergent compositions employed herein can comprise one or more conventional bleaching agents, activators, or stabilizers, especially peroxyacids, which do not react with the soil release compositions of this invention. In general, the formulator will ensure that the bleach compounds used are compatible with the detergent formulation. Conventional tests, such as tests of bleach activity on storage in the presence of the separate or fully-formulated ingredients, can be used for this purpose.

The peroxyacid can be a preformed peroxyacid, or a combination of an inorganic persalt (e.g., sodium perborate or sodium percarbonate), and an organic peroxyacid precursor which is converted to a peroxyacid when the combination of persalt and precursor is dissolved in water. The organic peroxyacid precursors are often referred to in the an as bleach activators.

Examples of suitable organic peroxyacids are disclosed in U.S. Pat. No. 4,374,035, Bossu, issued Feb. 15, 1983; U.S. Pat. No. 4,681,592, Hardy et al, issued Jul. 21, 1987; U.S. Pat. No. 4,634,551, Burns et al, issued Jan. 6, 1987; U.S. Pat. No. 4,686,063, Burns, issued Aug. 11, 1987; U.S. Pat. No. 4,606,838, Burns, issued Aug. 19, 1986; and U.S. Pat. No. 4,671,891, Hartman, issued Jun. 9, 1987. Examples of compositions suitable for laundry bleaching which contain perborate bleaches and activators therefor are disclosed in U.S. Pat. No. 4,412,934, Chung and Spadini, issued November 1983; U.S. Pat. No. 4,536,314, Hardy et al, issued Aug. 20, 1985; U.S. Pat. No. 4,681,695, Divo, issued Jul. 21, 1987; and U.S. Pat. No. 4,539,130, Thompson et al, issued Sep. 3, 1985.

Specific examples of preferred peroxyacids which can be incorporated in this invention include diperoxydodecanedioic acid (DPDA), nonylamide of peroxysuccinic acid (NAPSA), nonylamide of peroxyadipic acid (NAPAA) and decyldiperoxysuccinic acid (DDPSA). The peroxyacid is preferably incorporated into a soluble granule according to the method described in the above cited U.S. Pat. No. 4,374,035. A preferred bleach granule comprises, by weight, 1% to 50% of an exotherm control agent (e.g., boric acid); 1% to 25% of a peroxyacid compatible surfactant (e.g., C13LAS); 0.1% to 10% of one or more chelant stabilizers (e.g., sodium pyrophosphates); and 10% to 70% of a water-soluble processing salt (e.g., Na2SO4).

The peroxyacid bleach is used at a level which provides an amount of available oxygen (AvO) from about 0.1% to about 10%, preferably from about 0.5% to about 5%, and most preferably from about 1% to about 4%, all by weight of the composition.

Effective amounts of peroxyacid bleach per unit dose of the composition of this invention used in typical laundry liquor, e.g., containing 65 liters of 16°–60° C. water, provide from about 1 ppm to about 150 ppm of available oxygen (AvO), more preferably from about 2 ppm to about 20 ppm. The laundry liquor should also have a pH of from 7 to 11, preferably 7.5 to 10.5, for effective peroxyacid bleaching. See Col. 6, lines 1–10, of U.S. Pat. No. 4,374,035.

Alternatively, the composition may contain a suitable organic precursor which generates one of the above peroxyacids when reacted with alkaline hydrogen peroxide in aqueous solution. The source of hydrogen peroxide can be any inorganic peroxygen compound which dissolves in aqueous solution to generate hydrogen peroxide, e.g., sodium perborate (monohydrate and tetrahydrate) and sodium percarbonate.

The level of peroxygen bleach within compositions of the invention is from about 0.1% to about 95% and preferably from about 1% to about 60%. When the bleaching compositions within the invention are also fully formulated detergent compositions, it is preferred that the level of peroxygen bleach is from about 1% to about 20%.

The level of bleach activator within the compositions of the invention is from about 0.1% to about 60% and preferably from about 0.5% to about 40%. When the bleaching compositions within the invention are also fully formulated detergent compositions, it is preferred that the level of bleach activator is from about 0.5% to about 20%.

The peroxyacid and the soil release esters herein are preferably present at a weight ratio of available oxygen provided by the peroxyacid to soil release esters of from about 4:1 to about 1:30, more preferably from about 2:1 to about 1:15, and most preferably from about 1:1 to about 1:7.5. The combination can be incorporated into a fully formulated, stand alone product, or it can be formulated as an additive to be used in combination with a laundry detergent.

Enzymes—Optionally, the detergent compositions employed herein can comprise one or more conventional enzymes that do not react with the soil release compositions of this invention. Enzymes can be included in the present detergent compositions for a variety of purposes, including removal of protein-based, carbohydrate-based, or triglyceride-based stains from surfaces such as textiles or dishes, for the prevention of refugee dye transfer, for example in laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability optima, thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry, hard surface cleaning or personal care detergent composition. Preferred detersive enzymes are hydrolases such as proteases, amylases and lipases. Preferred enzymes for laundry purposes include, but are not limited to, proteases, cellulases, lipases and peroxidases. Highly preferred for automatic dishwashing are amylases and/or proteases, including both current commercially available types and improved types which, though more and more bleach compatible though successive improvements, have a remaining degree of bleach deactivation susceptibility.

Enzymes are normally incorporated into detergent or detergent additive compositions at levels sufficient to provide a "cleaning-effective amount". The term "cleaning effective amount" refers to any amount capable of producing a cleaning, stain removal, soil removal, whitening, deodorizing, or freshness improving effect on substrates such as fabrics, dishware and the like. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. For certain detergents, such as in automatic dishwashing, it may be desirable to increase the active enzyme content of the commercial preparation in order to minimize the total amount of non-catalytically active materials and thereby improve spotting/filming or other end-results. Higher active levels may also be desirable in highly concentrated detergent formulations.

Suitable examples of proteases are the subtilisins which are obtained from particular strains of B. subtilis and B. licheniformis. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

In more detail, an especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of Bacillus amyloliquefaciens subtilisin, as described in the patent applications of A. Baeck, et al, entitled "Protease-Containing Cleaning Compositions" having U.S. Ser. No. 08/322,676, and C. Ghosh, et al, "Bleaching Compositions Comprising Protease Enzymes" having U.S. Ser. No. 08/322,677, both filed Oct. 13, 1994.

Amylases suitable herein, especially for, but not limited to automatic dishwashing purposes, include, for example, α-amylases described in GB 1,296,839 to Novo; RAPIDASE®, International Bio-Synthetics, Inc. and TERMAMYL®, Novo. FUNGAMYL® from Novo is especially useful. Engineering of enzymes for improved stability, e.g., oxidative stability, is known. See, for example J. Biological Chem., Vol. 260, No. 11, June 1985, pp 6518–6521. Certain preferred embodiments of the present compositions can make use of amylases having improved stability in detergents such as automatic dishwashing types, especially improved oxidative stability as measured against a reference-point of TERMAMYL® in commercial use in 1993. These preferred amylases herein share the characteristic of being "stability-enhanced" amylases, characterized, at a minimum, by a measurable improvement in one or more of: oxidative stability, e.g., to hydrogen peroxide/tetraacetylethylenediamine in buffered solution at pH 9–10; thermal stability, e.g., at common wash temperatures such as about 60° C.; or alkaline stability, e.g., at a pH from about 8 to about 11, measured versus the above-identified reference-point amylase. Stability can be measured using any of the art-disclosed technical tests. See, for example, references disclosed in WO 9402597. Stability-enhanced amylases can be obtained from Novo or from Genencor International. One class of highly preferred amylases herein have the commonality of being derived using site-directed mutagenesis from one or more of the Baccillus amylases, especially the Bacillus α-amylases, regardless of whether one, two or multiple amylase strains are the immediate precursors. Oxidative stability-enhanced amylases vs. the above-identified reference amylase are preferred for use, especially in bleaching, more preferably oxygen bleaching, as distinct from chlorine bleaching, detergent compositions herein. Such preferred amylases include (a) an amylase according to the hereinbefore incorporated WO 9402597, Novo, Feb. 3, 1994, as further illustrated by a mutant in which substitution is made, using alanine or threonine, preferably threonine, of the methionine residue located in position 197 of the B. licheniformis alpha-amylase, known as TERMAMYL®, or the homologous position variation of a similar parent amylase, such as B. amyloliquefaciens, B. subtilis, or B. stearothermophilus; (b) stability-enhanced amylases as described by Genencor International in a paper entitled "Oxidatively Resistant alpha-Amylases" presented at the 207th American Chemical Society National Meeting, Mar. 13–17 1994, by C. Mitchinson. Therein it was noted that bleaches in automatic dishwashing detergents inactivate alpha-amylases but that improved oxidative stability amylases have been made by Genencor from B. licheniformis NCIB8061. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant. Stability was measured in CASCADE® and SUNLIGHT®; (c) particularly preferred amylases herein include amylase variants having additional modification in the immediate parent as described in WO 9510603 A and are available from the assignee, Novo, as DURAMYL®. Other particularly preferred oxidative stability enhanced amylase include those described in WO 9418314 to Genencor International and WO 9402597 to Novo. Any other oxidative stability-enhanced amylase can be used, for example as derived by site-directed mutagenesis from known chimeric, hybrid or simple mutant parent forms of available amylases. Other preferred enzyme modifications are accessible. See WO 9509909 A to Novo.

Cellulases usable herein include both bacterial and fungal types, preferably having a pH optimum between 5 and 9.5. U.S. Pat. No. 4,435,307, Barbesgoard et al, Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® (Novo) is especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also lipases in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPOLASE® enzyme derived from *Humicola lanuginosa* and commercially available from Novo, see also EP 341,947, is a preferred lipase for use herein. Lipase and amylase variants stabilized against peroxidase enzymes are described in WO 9414951 A to Novo. See also WO 9205249 and RD 94359044.

Cutinase enzymes suitable for use herein are described in WO 8809367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromoperoxidase. Peroxidase-containing detergent compositions are disclosed in WO 89099813 A, Oct. 19, 1989 to Novo and WO 8909813 A to Novo.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilised by various techniques. Enzyme stabilisation techniques are disclosed and exemplified in U.S. Pat. No. 3,600,319, Aug. 17, 1971, Gedge et al, EP 199,405 and EP 200,586, Oct. 29, 1986, Venegas. Enzyme stabilisation systems are also described, for example, in U.S. Pat. No. 3,519,570. A useful Bacillus, sp. AC13 giving proteases, xylanases and cellulases, is described in WO 9401532 A to Novo.

Enzyme Stabilizing System—Enzyme-containing, including but not limited to, liquid compositions, herein may comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

One stabilizing approach is the use of water-soluble sources of calcium and/or magnesium ions in the finished compositions which provide such ions to the enzymes. Calcium ions are generally more effective than magnesium ions and are preferred herein if only one type of cation is being used. Typical detergent compositions, especially liquids, will comprise from about 1 to about 30, preferably from about 2 to about 20, more preferably from about 8 to about 12 millimoles of calcium ion per liter of finished detergent composition, though variation is possible depending on factors including the multiplicity, type and levels of enzymes incorporated. Preferably water-soluble calcium or magnesium salts are employed, including for example calcium chloride, calcium hydroxide, calcium formate, calcium malate, calcium maleate, calcium hydroxide and calcium acetate; more generally, calcium sulfate or magnesium salts corresponding to the exemplified calcium salts may be used. Further increased levels of Calcium and/or Magnesium may of course be useful, for example for promoting the grease-cutting action of certain types of surfactant.

Another stabilizing approach is by use of borate species. See Severson, U.S. Pat. No. 4,537,706. Borate stabilizers, when used, may be at levels of up to 10% or more of the composition though more typically, levels of up to about 3% by weight of boric acid or other borate compounds such as borax or orthoborate are suitable for liquid detergent use. Substituted boric acids such as phenylboronic acid, butane-boronic acid, p-bromophenylboronic acid or the like can be used in place of boric acid and reduced levels of total boron in detergent compositions may be possible though the use of such substituted boron derivatives.

Stabilizing systems of certain cleaning compositions, for example automatic dishwashing compositions, may further comprise from 0 to about 10%, preferably from about 0.01% to about 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme, for example during dish- or fabric-washing, can be relatively large; accordingly, enzyme stability to chlorine in-use is sometimes problematic. Since perborate or percarbonate, which have the ability to react with chlorine bleach, may present in certain of the instant compositions in amounts accounted for separately from the stabilizing system, the use of additional stabilizers against chlorine, may, most generally, not be essential, though improved results may be obtainable from their use. Suitable chlorine scavenger anions are widely known and readily available, and, if used, can be salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Likewise, special enzyme inhibition systems can be incorporated such that different enzymes have maximum compatibility. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc., and mixtures thereof can be used if desired. In general, since the chlorine scavenger function can be performed by ingredients separately listed under better recognized functions, (e.g., hydrogen peroxide sources), there is no absolute requirement to add a separate chlorine scavenger unless a compound performing that function to the desired extent is absent from an enzyme-containing embodiment of the invention; even then, the scavenger is added only for optimum results. Moreover, the formulator will exercise a chemist's normal skill in avoiding the use of any enzyme scavenger or stabilizer which is majorly incompatible, as formulated, with other reactive ingredients, if used. In relation to the use of ammonium salts, such salts can be simply admixed with the detergent composition but are prone to adsorb water and/or liberate ammonia during storage. Accordingly, such materials, if present, are desirably protected in a particle such as that described in U.S. Pat. No. 4,652,392, Baginski et at.

The soil release agents of the invention, at concentrations in an aqueous fabric laundering liquor ranging from about 1 to about 50 ppm, more preferably about 2.5 to about 30 ppm, provide effective, combined cleaning and soil release treatments for polyester, polyester-cotton blends, and other synthetic fabrics washed in an aqueous, preferably alkaline (pH range about 7 to about 11, more preferably about 7.5 to about 10.5) environment, in the presence of typical granular detergent ingredients. Surprisingly (especially insofar as pH and anionic surfactant are concerned), the above-identified detergent ingredients can be present in the wash water at their art disclosed levels to perform their conventional tasks, e.g., for cleaning and bleaching fabrics or the like, without ill-effects on the soil release properties of the esters.

Thus the invention encompasses a method of laundering fabrics and concurrently providing a soil release finish thereto. The method preferably simply comprises contacting said fabrics with an aqueous laundry liquor containing the conventional detergent ingredients described hereinabove, as well as the above-disclosed effective levels of a soil release agent (namely, from about 0.25 to 200 ppm of an oligomeric composition comprising at least 10% by weight of an ester of the invention). Although this method is not especially limited in terms of factors such as pH and surfactant types present, it should be appreciated that for best cleaning of fabrics, it is often especially desirable to make use in the laundry process of anionic surfactants, such as conventional linear alkylbenzene sulfonates and also to use higher pH ranges as defined above. Use of these surfactants and pH ranges surprisingly does not prevent the esters of the invention from acting effectively as soil release agents. Thus, a preferred method for an optimized combination of cleaning and soil-release finishing provided by the invention constitutes using all of the following:

the preferred levels of soil release agent (2.5–30 ppm);

anionic surfactant;

pH of from about 7 to about 11; and, by way of soil release agent, a preferred composition of the invention.

In the preferred method polyester, polyester-cotton blends, and other synthetic fabrics are used; best soil release results are achieved thereon, but other fabric types can also be present.

The most highly preferred method for simultaneous cleaning and soil-release treatment is a "multi-cycle" method; although benefits are surprisingly obtainable after as little treatment as a single laundry/use cycle, best results are obtained using two or more cycles comprising the ordered sequence of steps:

a) contacting said fabrics with said aqueous laundry liquor in a conventional washing machine or by hand-wash for periods ranging from about 5 minutes to about 1 hour;

b) rinsing said fabrics with water;

c) line- or tumble-drying said fabrics; and d) exposing said fabrics to soiling through normal wear or domestic use.

Naturally, it will be appreciated that this "multi-cycle" method encompasses methods starting at any one of steps a) through d), provided that the soil release treatment step (a) is used two or more times. Optionally, a further "soaking" step may be included in the laundry/use cycle. Typically, users soak or pre-soak laundry for as little as five minutes to as long as overnight or longer by contacting said fabrics with said aqueous laundry liquor.

In the above, step (a) includes both hand-washing or U.S., Japanese, or European washing machines operating under their conventional conditions of time, temperature, fabric load, amounts of water and laundry product concentrations. Also, in step (c), the "tumble-drying" to which is referred especially involves use of conventional domestic brands of programmable laundry dryers (these are occasionally integral with the washing machine) using their conventional fabric loads, temperatures and operating times.

The following nonlimiting examples illustrate the use of a typical ester composition of the invention as a soil release agent for thru-the-wash application to polyester fabrics.

EXAMPLES 41 & 42

The following describe high density liquid detergent compositions according to the present invention:

| | Percent (Wt) | |
|---|---|---|
| Ingredient | 41 | 42 |
| Polyhydroxy Coco-Fatty Acid Amide | 3.65% | 3.50% |
| $C_{12}$–$C_{13}$ Alcohol Ethoxylate (9) | 3.65% | 0.80% |
| Na$C_{12}$–$C_{15}$ Alcohol Sulfate | 6.03% | 2.50% |
| Na$C_{12}$–$C_{15}$ Alcohol Ethoxylate (2.5) Sulfate | 9.29% | 15.10% |
| $C_{10}$ Amidopropyl Amine | 0 | 1.30% |
| Citric Acid | 2.44% | 3.00% |
| Fatty Acid ($C_{12}C_{14}$) | 4.23% | 2.00% |
| Ethanol | 3.00% | 2.81% |
| Monoethanolamine | 1.50% | 0.75% |
| Propanediol | 8.00% | 7.50% |
| Boric Acid | 3.50% | 3.50% |
| Tetraethylenepentamine | 0 | 1.18% |

-continued

| Ingredient | Percent (Wt) | |
|---|---|---|
| | 41 | 42 |
| Na Toluene Sulfonate | 2.50% | 2.25 |
| NaOH | 2.08% | 2.43% |
| Minors* | 1.60% | 1.30% |
| Oligomer (from example 8) | 0.33% | 0.22% |
| Water | Balance | Balance |

*Minors-includes optical brightener and enzymes (protease, lipase, cellulase, and amylase).

Compositions of the present invention are also prepared by preparing high density liquid formulas according to this example but utilizing in place of the indicated oligomer the oligomers of Examples 9–40, alone or in combination

EXAMPLES 43–46

Granular detergent compositions are prepared comprising the following ingredients.

| Ingredient | Percent (Wt) | | | |
|---|---|---|---|---|
| | 43 | 44 | 45 | 46 |
| Na $C_{11}$–$C_{13}$ alkylbenzenesulfonate | 13.3 | 13.7 | 10.4 | 11.1 |
| Na $C_{14}$–$C_{15}$ alcohol sulfate | 3.9 | 4.0 | 4.5 | 11.2 |
| Na $C_{14}$–$C_{15}$ alcohol ethoxylate (0.5) sulfate | 2.0 | 2.0 | 0.0 | 0.0 |
| Na $C_{12}$–$C_{13}$ alcohol ethoxylate (6.5) | 0.5 | 0.5 | 0.5 | 1.0 |
| Tallow fatty acid | 0.0 | 0.0 | 0.0 | 1.1 |
| Sodium tripolyphosphate | 0.0 | 41.0 | 0.0 | 0.0 |
| Zeolite A, hydrate (0.1–1.0 micron size) | 26.3 | 0.0 | 21.3 | 28.0 |
| Sodium carbonate | 23.9 | 12.4 | 25.2 | 16.1 |
| Sodium polyacrylate (45%) | 3.4 | 0.0 | 2.7 | 3.4 |
| Sodium silicate (1:6 ratio $NaO/SiO_2$)(46%) | 2.4 | 6.4 | 2.1 | 2.6 |
| Sodium sulfate | 10.5 | 10.9 | 8.2 | 15.0 |
| Sodium perborate | 1.0 | 1.0 | 5.0 | 0.0 |
| Poly(ethylene glycol), MW–4000 (50%) | 1.7 | 0.4 | 1.0 | 1.1 |
| Citric acid | 0.0 | 0.0 | 3.0 | 0.0 |
| Nonyl ester of sodium p-hydroxy-benzenesulfonate | 0.0 | 0.0 | 5.9 | 0.0 |
| Oligomer (from Example 8) | 0.5 | 0.5 | 0.5 | 0.5 |
| Moisture | 8.5 | 5.1 | 8.1 | 7.3 |

Balance to 100% can, for example, include minors like optical brightener, perfume, suds suppressor, soil dispersant, protease, lipase, cellulase, chelating agents, dye transfer inhibiting agents, additional water, and fillers, including $CaCO_3$, talc, silicates, etc.

Aqueous crutcher mixes of heat and alkali stable components of the detergent compositions are prepared and spray-dried and the other ingredients are admixed so that they contain the ingredients tabulated at the levels shown. The soil release agent of Example 8 is pulverized and admixed in an amount sufficient for use at a level of 0.5% by weight in conjunction with the detergent compositions.

The detergent granules with soil release agents are added (99.5 parts/0.5 parts by weight, respectively) together with a 6 lb. load of previously laundered fabrics (load composition: 10 wt. % polyester fabrics/50 wt. % polyester-cotton/40 wt. % cotton fabrics) to a Sears KENMORE washing machine. Actual weights of detergent and ester compositions are taken to provide a 995 ppm concentration of the former and 5 ppm concentration of the latter in the 17 gallon (65 l) water-fill machine. The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.). The fabrics are then line dried and are exposed to a variety of soils (by wear or controlled application). The entire cycle of laundering and soiling is repeated several times for each of the detergent compositions. Separate fabric bundles are reserved for use with each of the detergent compositions. All polyester-containing fabrics display significantly improved removal of soils (especially oleophilic types) during laundering compared with fabrics which have not been exposed to the esters of the invention.

Compositions of the present invention are also prepared by preparing granular detergent compositions according to this example but utilizing in place of the indicated oligomer the oligomers of Examples 9–40, alone or in combination The soil release agents of the invention are especially useful in conventional laundry detergent compositions such as those typically found in granular detergents or laundry bars. U.S. Pat. No. 3,178,370, Okenfuss, issued Apr. 13, 1965, describes laundry detergent bars and processes for making them. Philippine Patent 13,778, Anderson, issued Sep. 23, 1980, describes synthetic detergent laundry bars. Methods for making laundry detergent bars by various extrusion methods are well known in the art.

EXAMPLE 47

A laundry bar suitable for hand-washing soiled fabrics is prepared by standard extrusion processes and comprises the following:

| Component | Weight % |
|---|---|
| $C_{12}$ linear alkyl benzene sulfonate | 30 |
| Phosphate (as sodium tripolyphosphate) | 7 |
| Sodium carbonate | 25 |
| Sodium pyrophosphate | 7 |
| Coconut monoethanolamide | 2 |
| Zeolite A (0.1–10 micron) | 5 |
| Carboxymethylcellulose | 0.2 |
| Ethylenediamine disuccinate chelant (EDDS) | 0.4 |
| Polyacrylate (m.w. 1400) | 0.2 |
| Nonanoyloxybenzenesulfonate | 5 |
| Sodium percarbonate* | 5 |
| Brightener, perfume | 0.2 |
| Protease | 0.3 |
| $CaSO_4$ | 1 |
| $MgSO_4$ | 1 |
| Oligomer (from Example 8) | 0.5 |
| Water | 4 |
| Filler** | Balance to 100% |

*Average particle size of 400 to 1200 microns.
**Can be selected from convenient materials such as $CaCO_3$, talc, clay, silicates, and the like.

The detergent laundry bars are processed in conventional soap or detergent bar making equipment as commonly used in the art. The soil release agent of Example 8 is pulverized and admixed in an amount sufficient for use at a level of 0.5% by weight in conjunction with the detergent compositions. Testing is conducted following the testing methods in Examples 43–46. All polyester-containing fabrics display significantly improved removal of soils (especially oleophilic types) during laundering compared with fabrics which have not been exposed to the esters of the invention.

Compositions of the present invention are also prepared by preparing bar formulas according to this example but utilizing in place of the indicated oligomer the oligomers of Examples 9–40, alone or in combination

EXAMPLES 48 and 49

Laundry bars suitable for hand-washing soiled fabrics are prepared by standard extrusion processes and comprise the following:

|  | Example 48 | Example 49 |
|---|---|---|
| LAS | 12% | 6% |
| Soap | 44% | 29% |
| STPP | 5% | 5% |
| NaCarbonate | 4% | 6% |
| Brightener | 0.03% | 0 |
| Talc | 0 | 35.5% |
| Perfume | 0.45% | 0 |
| Sulfate | 0.29% | 0 |
| Bentonite Clay | 12.81% | 0 |
| NaCl | 2% | 2% |
| Oligomer (from Example 8) | 0.5% | 0.5% |
| Other | 0.42% | 1.5% |
| Water | 19% | 15% |

Compositions of the present invention are also prepared by preparing bar formulas according to this example but utilizing in place of the indicated oligomer the oligomers of Examples 9–40, alone or in combination.

What is claimed is:

1. Oligomeric esters which are effective as soil release agents comprising:

(1) a backbone comprising
    (a) at least one unit selected from the group consisting of dihydroxy or polyhydroxy sulfonate, a unit which is at least trifunctional whereby ester linkages are formed resulting in a branched oligomer backbone, and combinations thereof;
    (b) at least one unit which is a terephthaloyl moiety; and
    (c) at least one unsulfonated unit which is a 1,2-oxyalkleneoxy moiety; and (2) one or more capping units selected from nonionic capping units, anionic capping units, and mixtures thereof.

2. Oligomeric esters according to claim 1 comprising dihydroxy or polyhydroxy sulfonate units having the structure:

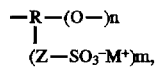

wherein n is an integer of 1 or greater; m is an integer of 1 or greater; R is an alkyl-containing moiety having at least 2 carbon atoms; Z is a side-chain moiety selected from the group consisting of alkyl, oxyalkyl, alkyloxyalkyl, aryl, oxyaryl, alkyloxyaryl, or Z is a single bond when R contains 3 or more carbon atoms, and combinations thereof; and M is a cationic moiety.

3. Oligomeric esters according to claim 2 comprising dihydroxy or polyhydroxy sulfonate units selected from the group consisting of (1) SCE$_x$G having the structure:

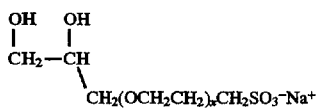

wherein x is from about 0 to about 20;

(2) SE$_x$G having the structure:

wherein x is from about 0 to about 20; and (3) SPE$_x$G having the structure:

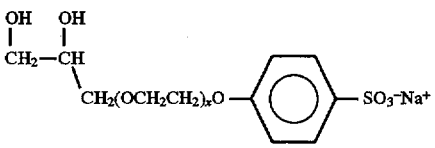

wherein x is from about 0 to about 20; and the isomeric structures of (1), (2) and (3), and mixtures thereof.

4. Oligomeric esters according to claim 2 comprising dihydroxy or polyhydroxy sulfonate units selected from the group consisting of dihydroxysulfonate monomer which is a sulfoethyl ether of glycerin having the structures:

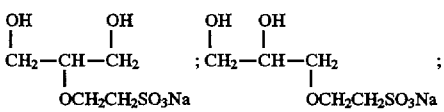

and mixtures thereof.

5. Oligomeric esters according to claim 1 comprising a unit which is at least trifunctional whereby ester linkages are formed resulting in a branched oligomer backbone having the structure:

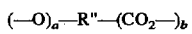

wherein a+b is at least 3 and a and b are zero or greater; and R" is an alkyl, aryl, or alkylaryl moiety having at least 3 carbon atoms, and wherein further for those R" comprising an aryl moiety, the number "a" of hydroxy groups capable of forming ester backbone linkages does not include phenol hydroxyl groups.

6. Oligomeric esters according to claim 5 comprising a unit which is at least trifunctional whereby ester linkages are formed resulting in a branched oligomer backbone wherein a=2 or greater.

7. Oligomeric esters according to claim 6 comprising a unit which is at least trifunctional whereby ester linkages are formed resulting in a branched oligomer backbone selected from the group consisting of units derived from monomers which contain at least one 1,2-diol moiety having the structure HOCH$_2$CH(OH)—R".

8. Oligomeric esters according to claim 5 comprising a unit which is at least trifunctional whereby ester linkages are formed resulting in a branched oligomer backbone wherein a=3 or greater and b=0.

9. Oligomeric esters according to claim 8 wherein the unit comprises glycerol.

10. Oligomeric esters according to claim 2 comprising one or more anionic capping unit.

11. Oligomeric esters according to claim 10 wherein the anionic capping unit is selected from the group consisting of:

a) ethoxylated isethionate derivatives having the structure:

wherein x is 1 or greater, and M is a cationic moiety;

b) ethoxylated propanesulfonate derivatives having the structure:

wherein x is 0 or greater, and M is a cationic moiety;

c) ethoxylated propanedisulfonate derivatives having the structure:

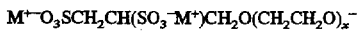

wherein x is 0 or greater, and M is a cationic moiety;

d) ethoxylated phenolsulfonate derivatives having the structure:

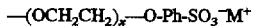

wherein x is 1 or greater, and M is a cationic moiety; and e) sulfoaroyl derivatives; and mixtures thereof.

12. Oligomeric esters according to claim 5 comprising one or more anionic capping unit.

13. Oligomeric esters according to claim 12 wherein the anionic capping unit is selected from the group consisting of:

a) ethoxylated isethionate derivatives having the structure:

wherein x is 1 or greater, and M is a cationic moiety;

b) ethoxylated propanesulfonate derivatives having the structure:

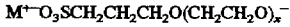

wherein x is 0 or greater, and M is a cationic moiety;

c) ethoxylated propanedisulfonate derivatives having the structure:

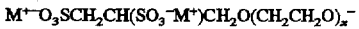

wherein x is 0 or greater, and M is a cationic moiety;

d) ethoxylated phenolsulfonate derivatives having the structure:

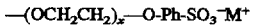

wherein x is 1 or greater, and M is a cationic moiety; and e) sulfoaroyl derivatives; and mixtures thereof.

14. Oligomeric esters which are effective as soil release agents comprising from about 25% to about 100% by weight of ester having the empirical formula $(CAP)_x(EG/PG)_{y'}(DEG)_{y''}(PEG)_{y'''}(T)_z(SI)_{z'}(SEG)_q(B)_m$; wherein:

i): (CAP) represents capping units;

ii): (EG/PG) represents oxyethyleneoxy and oxy-1,2-propyleneoxy units;

iii): (DEG) represents optional di(oxyethylene)oxy units;

iv): (PEG) represents optional poly(oxyethylene)oxy units;

v) (T) represents terephthaloyl units;

vi): (SI) represents optional sulfoisophthaloyl units;

vii): (SEG) represents units derived from the sulfoethyl ether of glycerin and related moiety units; and vii): (B) represents branching units which are at least trifunctional whereby ester linkages are formed resulting in a branched oligomer backbone;

and wherein x is from about 1 to about 12; y' is from about 0.5 to about 25; y" is from 0 to about 12; y'" is from 0 to about 10; y'+y"+y'" totals from about 0.5 to about 25; z is from about 1.5 to about 25; z' is from about 0 to about 12; z+z' totals from about 1.5 to about 25; q is from about 0.05 to about 12; m is from about 0.01 to about 10; and wherein x, y', y", y'", z, z', q and m represent the average number of moles of the corresponding units per mole of said ester and said ester has a molecular weight ranging from about 500 to about 5,000.

15. Oligomeric esters according to claim 14 wherein x is from about 1 to about 4, y' is from about 1 to about 15, y" is from about 0 to about 8, y'" is from about 0 to about 5, z is from about 2.5 to about 15, z' is from about 0 to about 7, q is from about 0.25 to about 7, and m is from about 0.1 to about 2.

16. Oligomeric esters according to claim 15 wherein (CAP) comprises anionic capping units.

17. A detergent compositions comprising:
(i) at least about 1% of a detersive surfactant;
(ii) at least about 1% of a detergent builder; and
(iii) at least about 0.01% of an oligomeric ester soil release agent according to claim 1.

18. A detergent compositions comprising:
(i) at least about 1% of a detersive surfactant;
(ii) at least about 1% of a detergent builder; and
(iii) at least about 0.01% of an oligomeric ester soil release agent according to claim 2.

19. A detergent compositions comprising:
(i) at least about 1% of a detersive surfactant;
(ii) at least about 1% of a detergent builder; and
(iii) at least about 0.01% of an oligomeric ester soil release agent according to claim 4.

20. A detergent compositions comprising:
(i) at least about 1% of a detersive surfactant;
(ii) at least about 1% of a detergent builder; and
(iii) at least about 0.01% of an oligomeric ester soil release agent according to claim 5.

21. A detergent compositions comprising:
(i) at least about 1% of a detersive surfactant;
(ii) at least about 1% of a detergent builder; and
(iii) at least about 0.01% of an oligomeric ester soil release agent according to claim 9.

22. A detergent compositions comprising:
(i) at least about 1% of a detersive surfactant;
(ii) at least about 1% of a detergent builder; and
(iii) at least about 0.01% of an oligomeric ester soil release agent according to claim 11.

23. A detergent compositions comprising:
(i) at least about 1% of a detersive surfactant;
(ii) at least about 1% of a detergent builder; and
(iii) at least about 0.01% of an oligomeric ester soil release agent according to claim 13.

24. A detergent compositions comprising:
(i) at least about 1% of a detersive surfactant;
(ii) at least about 1% of a detergent builder; and
(iii) at least about 0.01% of an oligomeric ester soil release agent according to claim 14.

25. A detergent compositions comprising:

(i) at least about 1% of a detersive surfactant;

(ii) at least about 1% of a detergent builder; and (iii) at least about 0.01% of an oligomeric ester soil release agent according to claim 16.

26. Oligomeric esters effective as soil release agents derived by a process which comprises at least one step of reacting:

1) dimethyl terephthalate:

2) optionally, dimethyl 5-sulfoisophthalate;

3) one or more glycol reactants selected from the group consisting of:
   a) ethylene glycol;
   b) propylene glycol; and
   c) a mixture of a) and b);

4) sulfoethyl ether of glycerin; and 5) optionally, glycerol.

27. Oligomeric esters according to claim 26 wherein said glycol reactant consists essentially of ethylene glycol.

28. A method of treating fabrics to provide a soil release finish thereto, said method comprising contacting said fabrics with a liquid medium containing at least from about 0.25 ppm to about 200 ppm of the soil release agent according to claim 1.

29. A method according to claim 28 wherein said fabrics are subjected to two or more cycles each comprising the ordered sequence of steps:

a) contacting said fabrics with said aqueous laundry liquor in a conventional washing-machine or by hand-wash for periods ranging from about 5 minutes to about 1 hour;

b) rinsing said fabrics with water;

c) line- or tumble-drying said fabrics; and d) exposing said fabrics to soiling through normal wear or domestic use.

30. A method for manufacturing sulfoethyl ether of glycerin, said method comprising the step of reacting glycerin with isethionate in the presence of at least 12 mole % of hydroxide base.

* * * * *